United States Patent
Navok et al.

(10) Patent No.: US 9,873,056 B2
(45) Date of Patent: Jan. 23, 2018

(54) GAME SYSTEM INCLUDING THIRD PARTY INPUT

(71) Applicant: SQUARE ENIX HOLDINGS CO., LTD., Tokyo (JP)

(72) Inventors: Jacob Navok, Stamford, CT (US); Yoichi Wada, Tokyo (JP)

(73) Assignee: SQUARE ENIX HOLDINGS CO., LTD., Tokyo (JP)

( * ) Notice: Subject to any disclaimer, the term of this patent is extended or adjusted under 35 U.S.C. 154(b) by 213 days.

(21) Appl. No.: 14/854,312

(22) Filed: Sep. 15, 2015

(65) Prior Publication Data

US 2017/0072324 A1 Mar. 16, 2017

(51) Int. Cl.
- A63F 13/45 (2014.01)
- A63F 13/86 (2014.01)
- A63F 13/35 (2014.01)
- A63F 13/65 (2014.01)

(52) U.S. Cl.
CPC ............. *A63F 13/86* (2014.09); *A63F 13/35* (2014.09); *A63F 13/65* (2014.09)

(58) Field of Classification Search
CPC ........... A63F 13/35; A63F 13/65; A63F 13/86
USPC .......................................................... 463/31
See application file for complete search history.

(56) References Cited

U.S. PATENT DOCUMENTS

| | | | |
|---|---|---|---|
| 6,999,083 B2 | 2/2006 | Wong et al. | |
| 7,446,772 B2 | 11/2008 | Wong et al. | |
| 7,458,894 B2 | 12/2008 | Danieli et al. | |
| 7,632,186 B2 | 12/2009 | Spanton et al. | |
| 7,674,166 B2 | 3/2010 | Takahashi et al. | |
| 8,025,569 B2 | 9/2011 | Nguyen et al. | |
| 8,025,572 B2 | 9/2011 | Spanton et al. | |
| 8,235,817 B2 | 8/2012 | Zalewski | |
| 8,628,424 B1 | 1/2014 | Kern et al. | |
| 8,636,589 B2 | 1/2014 | Harris et al. | |
| 8,661,496 B2 | 2/2014 | Perlman et al. | |
| 8,795,086 B2 | 8/2014 | Rudi et al. | |
| 8,834,268 B2 | 9/2014 | Kern et al. | |
| 9,053,605 B2 | 6/2015 | Barclay et al. | |
| 2003/0003990 A1 | 1/2003 | Kohorn | |
| 2003/0220143 A1* | 11/2003 | Shteyn .................... | A63F 13/12 463/42 |

(Continued)

OTHER PUBLICATIONS

U.S. Appl. No. 14/854,284 to Philippe Malenfant, filed Sep. 15, 2015.

(Continued)

*Primary Examiner* — Allen Chan
(74) *Attorney, Agent, or Firm* — Greenblum & Bernstein, P.L.C.

(57) ABSTRACT

Methods, systems, devices, and media for controlling a network game in accordance with an input of a game spectator are provided. A network interface receives player input information from a game player and spectator input information from the game spectator. The network game is progressed in accordance with the player input information received by the network interface from the game player, and an aspect of the network game of the game player is controlled in accordance with the spectator input information received by the network interface. The spectator input information specifies the game player and the aspect of the network game of the game player to be controlled.

18 Claims, 12 Drawing Sheets

(56) References Cited

U.S. PATENT DOCUMENTS

| | | | |
|---|---|---|---|
| 2008/0146339 A1 | 6/2008 | Olsen et al. | |
| 2010/0167816 A1* | 7/2010 | Perlman | A63F 13/12 463/30 |
| 2010/0304869 A1 | 12/2010 | Lee et al. | |
| 2011/0263333 A1* | 10/2011 | Dokei | A63F 13/34 463/42 |
| 2012/0094737 A1* | 4/2012 | Barclay | G07F 17/3213 463/20 |
| 2013/0288799 A1* | 10/2013 | Harris | A63F 13/86 463/42 |
| 2014/0004951 A1* | 1/2014 | Kern | A63F 13/86 463/42 |
| 2014/0018157 A1 | 1/2014 | Kern et al. | |
| 2014/0031121 A1 | 1/2014 | Kern et al. | |
| 2014/0141851 A1* | 5/2014 | Rubin | H04L 12/1818 463/9 |
| 2014/0213362 A1 | 7/2014 | Perlman et al. | |
| 2015/0141145 A1 | 5/2015 | Perlman et al. | |
| 2015/0231506 A1* | 8/2015 | Webb | A63F 13/35 463/29 |
| 2015/0251095 A1* | 9/2015 | Perrin | G06T 15/005 463/31 |

OTHER PUBLICATIONS

U.S. Appl. No. 14/854,232 to Jacob Navok et al., filed Sep. 15, 2015.

Bharambe et al., "Supporting spectators in online multiplayer games", Proc. Of HotNets, 2004. Available at http://www-2.cs.cmu.edu/~ashu/papers/hotnets2004.pdf.

Tgwrils, "We need CS: GO TV right now!", HLTV, hltv.org, Sep. 12, 2012. Available at http://www.hltv.org/news/9072-we-need-csgo-tv-right-now.

Richards, Matt, "Multiplayer Games: A Spectator's View", Parsons School of Design and Technology, Dec. 12, 2003. Available at http://a.parsons.edu/~mr/thesis/pdfs/research_doc.pdf.

Hoffman, Chris, "HTG Explains: What is Cloud Gaming and Is it the Future?", How-To Geek, howtogeek.com, Apr. 21, 2013. Available at http://www.howtogeek.com/160851/htg-explains-what-is-cloud-gaming-and-is-it-the-future/.

* cited by examiner

GAME SYSTEM INCLUDING THIRD PARTY INPUT

BACKGROUND

1. Field of the Disclosure

The present disclosure generally relates to the field of network gaming. More particularly, the present disclosure relates to various systems, methods, and media for controlling a network game in accordance with an input of a game spectator.

2. Background Information

Recently, electronic gaming has become accepted as a new variety of sport or, more appropriately, an e-sport. The acceptance of gaming as an e-sport has given rise to increasingly larger and more popular gaming events, such as the Evolution Championship Series. These events have created a significant viewing interest in network gaming.

In order to satisfy the viewing interest, electronic game players have resorted to gamecasting. Gamecasting is an activity during which a game player broadcasts a live stream of his or her own game screen, typically using a screen capture application. The live stream is broadcast via the Internet or other network to enable third parties to view or watch the player's game play during real-time.

While traditional methods of gamecasting have provided a medium for viewing electronic gaming, the third parties are typically limited to viewing only those game screens which are broadcast by the players. In addition, the third parties lack interactivity and involvement in the gamecasts. As such, new and improved methods for viewing network games are desired.

SUMMARY OF THE DISCLOSURE

The present disclosure, through one or more of its various aspects, embodiments, and/or specific features or sub-components, provides, inter alia, various systems, servers, methods, media, and programs for controlling a network game in accordance with an input of a game spectator.

According to a non-limiting embodiment of the present disclosure, a system for controlling a network game in accordance with an input of a game spectator is provided. The system includes a network interface that receives player input information from a game player and spectator input information from the game spectator. The system also includes a processor and a memory that includes a game program including a set of instructions that, when executed by the processor, causes the processor to perform operations. The operations include progressing the network game in accordance with the player input information received by the network interface from the game player, and controlling an aspect of the network game of the game player in accordance with the spectator input information received by the network interface. The spectator input information specifies the game player and the aspect of the network game of the game player to be controlled.

According to one aspect of the present disclosure, the game player executes a game client that establishes a connection with the game system for transmitting the player input information to the network interface, and the game spectator does not execute the game client.

According to another aspect of the present disclosure, the network interface receives the spectator input information from the game spectator via a web server. The web server provides a broadcast of the network game to the game spectator.

According to yet another aspect of the present disclosure, the game system further includes a broadcaster that transmits the broadcast of the network game to the web server.

According to still another aspect of the present disclosure, the game system further includes: a game server that includes the network interface, the processor, and the memory; a rendering server that receives game information from the game server, generates a player game screen for the game player, and generates a spectator game screen for the game spectator. The player game screen is transmitted to the game player for display by the game player. The spectator game screen is transmitted to the broadcaster for transmission to the web server as the broadcast of the network game.

According to an additional aspect of the present disclosure, the spectator game screen comprises the player game screen.

According to another aspect of the present disclosure, the game server, the rendering server, and the broadcaster do not transmit any game data to the game spectator.

According to yet another aspect of the present disclosure, the broadcaster transmits identification information to the web server in association with the broadcast of the network game for identifying the game player. The network interface receives the identification information from the web server in association with the spectator input information. The processor determines the game player from among a plurality of game players based on the identification information.

According to still another aspect of the present disclosure, the web server provides the broadcast of the network game to the game spectator as a unicast transmission.

According to an additional aspect of the present disclosure, the spectator input information specifies a player character of the game player, and the processor controls an aspect of the player character in the network game.

According to another aspect of the present disclosure, the aspect of the player character includes at least one of a hit point of the player character and an item inventory.

According to yet another aspect of the present disclosure, the network interface is configured to receive the spectator input information at an arbitrary timing during a progress of the network game.

According to still another aspect of the present disclosure, the operations further include transmitting a request for the spectator input information, with the spectator input information being received by the network interface in response to the request.

According to an additional aspect of the present disclosure, the processor controls the aspect of the network game when the network interface receives the spectator input information.

According to another aspect of the present disclosure, the network interface receives personal information of the game spectator in association with the spectator input information, and the processor controls the aspect of the network game of the game player in response to verifying the personal information of the game spectator.

According to yet another aspect of the present disclosure, the operations further include: transmitting an option for accepting the spectator input information to the game player based on the spectator input information received by the network interface; controlling the aspect of the network game of the game player in response to the game player accepting the option; and penalizing the game player for accepting the option.

According to another non-limiting embodiment of the present disclosure, a method for controlling a network game hosted by a game system in accordance with an input of a game spectator is provided. The method includes the features of receiving, by a network interface, player input information from a game player, and receiving, by the network interface, spectator input information from the game spectator. The method further includes the features of controlling, by a processor, a progress of the network game in accordance with the player input information received by the network interface from the game player, and controlling, by the processor, an aspect of the network game of the game player in accordance with the spectator input information received by the network interface. The spectator input information specifies the game player and the aspect of the network game to be controlled.

According to an aspect of the present disclosure, the game player executes a game client that establishes a connection with the game system for transmitting the player input information to the network interface, and the game spectator does not execute the game client.

According to yet another non-limiting embodiment of the present disclosure, a non-transitory computer readable medium including a program for controlling a network game hosted by a game system in accordance with an input of a game spectator is provided. The program, when executed by at least one processor of the game system, causes the game system to perform operations including receiving, by a network interface, player input information from a game player, and receiving, by the network interface, spectator input information from the game spectator. The operations further include controlling, by a processor, a progress of the network game in accordance with the player input information received by the network interface from the game player, and controlling, by the processor, an aspect of the network game of the game player in accordance with the spectator input information received by the network interface. The spectator input information specifies the game player and the aspect of the network game to be controlled.

According to an aspect of the present disclosure, the game player executes a game client that establishes a connection with the game system for transmitting the player input information to the network interface, and the game spectator does not execute the game client.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

The present disclosure provides various network game systems, devices, methods, media, and programs for controlling a network game in accordance with an input of a game spectator.

Figure 1:
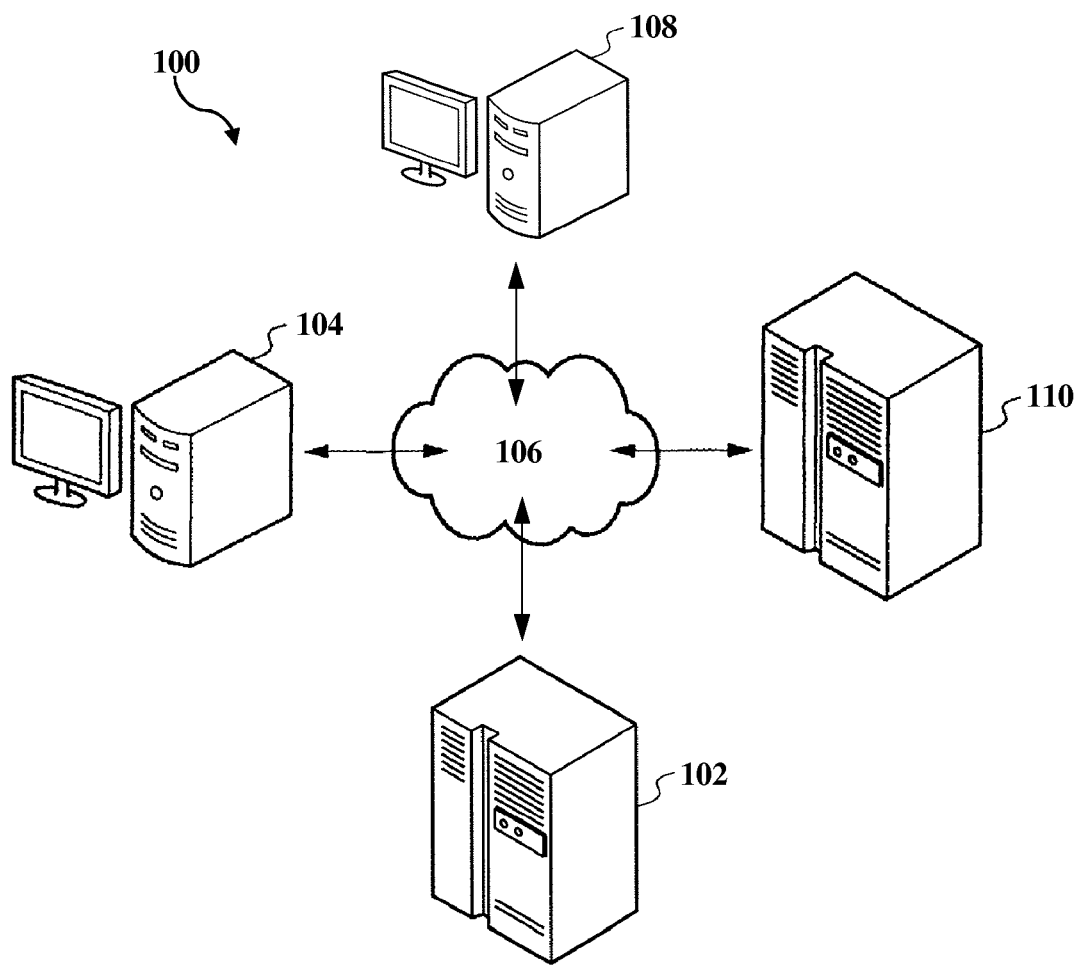
FIG. 1 shows an exemplary system for controlling a network game in accordance with an input of a game spectator, according to an aspect of the present disclosure.

An exemplary embodiment of a network game system is generally shown in FIG. 1 at 100. The network game system 100 includes a game system 102 to which a game player 104 is connected via a network 106. The game system 102 receives player input information from the game player 104 and progresses the network game in accordance with the player input information. The game system 102 also receives spectator input information based on an input of a game spectator 108 and controls an aspect of the network game of the game player 104 in accordance with the spectator input information. The spectator input information specifies the game player 104, or a game character controlled thereby, and the aspect of the network game to be controlled. For example, the spectator input information may increase a hit point of the player character in the network game, add an item to an inventory of the player character, or make the player character invisible.

In an embodiment of the network game system 100, the game system 102 may generate and transmit a broadcast of the network game to a web server 110. The broadcast may be generated and transmitted in correspondence with a specific client view of the game player 104. The web server 110 displays the broadcast, such as via a website or other display interface. The game spectator 108 is able to view the broadcast of the network game via the web server 110, and is able to transmit the spectator input information to the game system 102, such as via the web server 110, based on a viewing of the broadcast. Thereafter, the game system 102 is able to control the aspect of the network game of the game player 104, such as by associating the spectator input information with the broadcast which is generated and transmitted in correspondence with the specific client view of the game player 104. Since the game system 102 provides the broadcast of the network game, the game system 102 is able to receive the spectator input information in association therewith.

Accordingly, the game spectator 108 is able to assist, hinder, or otherwise affect or control an aspect of the network game of the game player 104, or a game character controlled thereby. As a result, the game spectator 108 is provided with a sense of interactivity and involvement in the network game, thereby providing a more enjoyable and appealing network game viewing experience.

In addition, since the broadcast is generated by the game server 102 and provided to the web server 110, the game spectator 108 is able to follow the broadcast of the network game without knowing, being associated with, or following any particular game player 104. The game spectator 108 also need not possess, own, or run a network game client or other software for participating in the network game, as the game spectator 108 is able to access the broadcast via the web server 110. Accordingly, a broader audience of the game spectator 108 is possible.

Moreover, again since the broadcast is generated by the game system 102 instead of the game player 104, the broadcast is not limited to comprising only a view or broadcast of a screen of the game player 104. For example, the broadcast may include a specific request for the spectator input information, as well as additional game information regarding the game player 104 or a state of the network game. These additional pieces of information are not feasible with traditional, player-side broadcasting applications. In other words, the server-side broadcast of the present disclosure may include information which is not readily apparent to player-side broadcasting applications. As a result, a more diverse game viewing environment is possible.

The broadcast may also include, for example, inputs and input-combinations of the game player 104 such that the broadcast may function as a teaching or learning application while still providing the interactivity and involvement in the network game to the game spectator 108. As a result, an interest in the broadcast may further be enhanced by the dual functionality of learning and control.

Still further, again since the broadcast is generated by the game system 102 instead of the game player 104, the broadcast is not limited by any graphics processing or display capabilities of the game player 104, but rather, may be provided to the web server 110 in accordance with the capabilities of the game system 102. As a result, an improved viewing experience is also provided.

Of course, the above-described features and advantages are not limiting or exhaustive. Additional features and advantages of the network game system 100 will be apparent from the following description and embodiments. Accordingly, in view of the foregoing, the present disclosure, through one or more of its various aspects, embodiments, and/or specific features or sub-components, is thus intended to bring out one or more of the advantages as specifically discussed above and as noted below.

Figure 2:
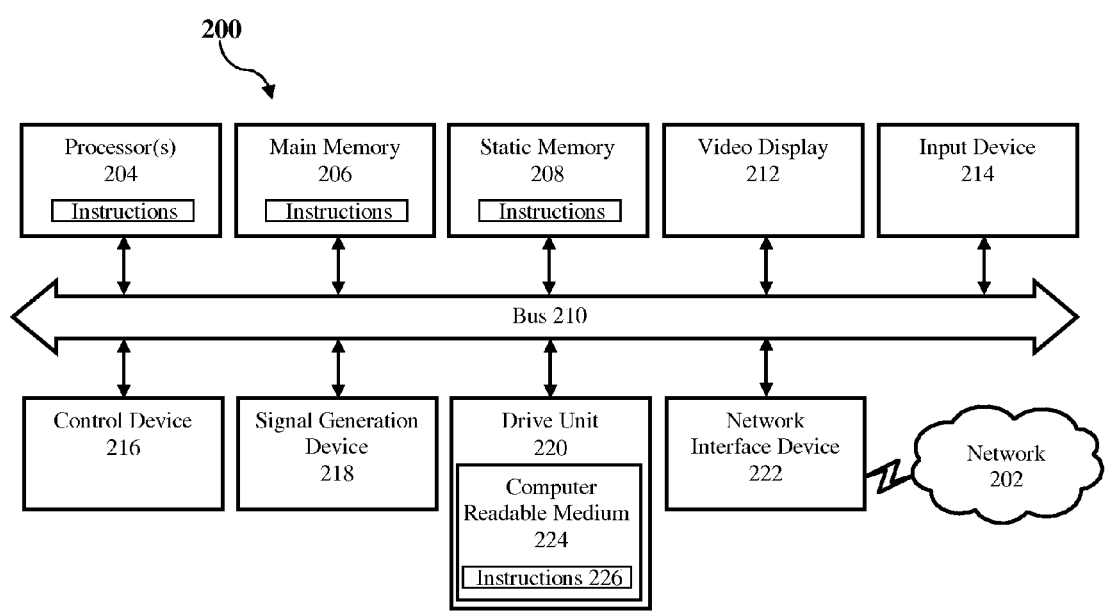
FIG. 2 shows a schematic of an exemplary game system, according to an aspect of the present disclosure.

An exemplary embodiment of the game system 102 is generally shown at 200 in FIG. 2. The exemplary game system 200 of FIG. 2 is hereinafter referred to as computer system 200 for convenience. The computer system 200 may include a set of instructions that can be executed to cause the computer system 200 to perform any one or more of the methods or computer based functions disclosed herein. The computer system 200 may operate as a standalone device or may be connected, for example, using a network 202, to other computer systems or peripheral devices such as the game player 104, the web server 110, and the game spectator 108.

In a networked deployment, the computer system 200 may operate in the capacity of a server or as a client user computer in a server-client user network environment, a client user computer in cloud computing environment, or as a peer computer system in a peer-to-peer (or distributed) network environment. The computer system 200 can also be implemented as or incorporated into various devices, such as a stationary computer, a mobile computer, a personal computer (PC), a laptop computer, a tablet computer, a wireless smart phone, a set-top box (STB), a personal digital assistant (PDA), a global positioning satellite (GPS) device, a communications device, a control system, a camera, a web appliance, a network router, switch or bridge, or any other machine capable of executing a set of instructions (sequential or otherwise) that specify actions to be taken by that machine. For example, the computer system 200 may be implemented as, or incorporated into, an automobile or a wearable device, such as, but not limited to, watches, glasses, bracelets, and headsets. The computer system 200 can be incorporated as or in a particular device that in turn is in an integrated system that includes additional devices. In a particular embodiment, the computer system 200 can be implemented using electronic devices that provide voice, video or data communication. Further, while a single computer system 200 is illustrated, the term "system" shall also be taken throughout the present disclosure to include any collection of systems or sub-systems that individually or jointly execute a set, or multiple sets, of instructions to perform one or more computer functions.

As illustrated in FIG. 2, the computer system 200 includes a processor 204. The processor 204 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 204 is an article of manufacture and/or a machine component. The processor 204 is configured to execute software instructions in order to perform functions as described in the various embodiments herein. The processor 204 may be a general purpose processor or may be part of an application specific integrated circuit (ASIC). The processor 204 may also be a microprocessor, a microcomputer, a processor chip, a controller, a microcontroller, a digital signal processor (DSP), a state machine, or a programmable logic device. The processor 204 may also be a logical circuit, including a programmable gate array (PGA) such as a field programmable gate array (FPGA), or another type of circuit that includes discrete gate and/or transistor logic. The processor 204 may be a central processing unit (CPU), a graphics processing unit (GPU), or both. Additionally, any processor described herein may include multiple processors, parallel processors, or both. Multiple processors may be included in, or coupled to, a single device or multiple devices.

Moreover, the computer system 200 includes at least one of a main memory 206 and a static memory 208. The main memory 206 and the static memory 208 can communicate with each other via a bus 210. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted.

As shown, the computer system 200 may further include a video display device 212, such as a liquid crystal display (LCD), an organic light emitting diode (OLED), a flat panel display, a solid state display, or a cathode ray tube (CRT). The video display device 212 may be integrated with or physically separate from the components of the computer system 200 described herein.

Additionally, the computer system 200 may include an input device 214, such as a keyboard/virtual keyboard or touch-sensitive input screen or speech input with speech recognition. The computer system 200 may also include a cursor control device 216, such as a mouse or touch-sensitive input screen or pad, a microphone, etc. The computer system 200 may also include a signal generation device 218, such as a speaker or remote control, a game disk drive unit 220, and a network interface device 222.

In a particular embodiment, as depicted in FIG. 2, the game disk drive unit 220 may include a game computer-readable medium 224 in which one or more sets of instructions 226, e.g. software, can be embedded. Additionally or alternatively to the game disk drive unit 220, the computer system 200 may comprise any additional storage unit, such as, but not limited to, a solid state storage or other persistent storage, which comprises the computer-readable medium 224. Sets of instructions 226 can be read from the game computer-readable medium 224. Further, the instructions 226, when executed by a processor, can be used to perform one or more of the methods and processes as described herein. In a particular embodiment, the instructions 226 may reside completely, or at least partially, within the main memory 206, the static memory 208, and/or within the processor 204 during execution by the computer system 200.

Figure 3:
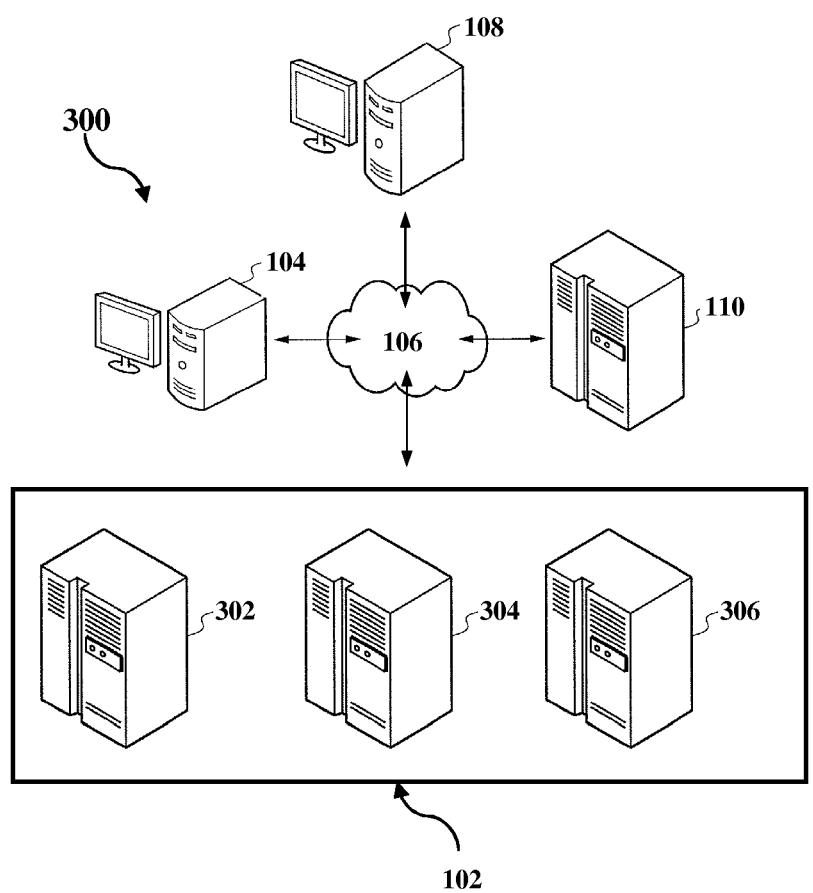
FIG. 3 shows a further exemplary system for controlling a network game in accordance with an input of a game spectator, according to an additional aspect of the present disclosure.

FIG. 3 shows a further embodiment of the network game system 100 of FIG. 1. The network game system of FIG. 3 is generally shown at 300. In the network game system 300 of FIG. 3, the game system 102 includes a game server 302, a rendering server 304, and a broadcaster 306. The game system 102 may additionally include the network interface 110, or any combination of the above-described entities or features as discussed with respect to FIG. 2. The game system 102 is generally described hereinafter as corresponding to the embodiment shown in FIG. 3. Nevertheless, it should be understood that the game system 102 may include additional or alternative embodiments in accordance with the embodiment shown in FIG. 2.

The network 106 may be, but is not limited to, a local area network, a wide area network, the Internet, a telephony network, or any other network commonly known and understood in the art. The network 106 is shown in FIG. 3 as being a wireless network. However, those skilled in the art appreciate that the network 106 may additionally or alternatively comprise a wired network.

The game system 102 is generally described herein as providing or hosting a network game. In this regard, the network game may be a multiplayer type network game or a single player type network game. The network game may be an action game, a shooter game, an adventure game, a role-playing game, a simulation game, a strategy game, or any other type of game generally known and understood in the art. While the game system 102 is generally described as providing the network game, additional or alternative services may also be provided without departing from the scope of the present disclosure. For example, the network game may be any other service which is provided via a network such as, but not limited to, a music program, an art program, an animation program, etc.

The game player 104 and the game spectator 108 are each shown in FIG. 3 in singular form. Nevertheless, it is to be known and understood that the network game system 300 may comprise a plurality of game players and a plurality of game spectators. In this regard, the game player 104 and the game spectator 108 are generally described hereinafter in singular forms for convenience, although those of ordinary skill in the art appreciate that the plural forms may generally be used interchangeably. Also, while the game player 104 and game spectator 108, or game players 104 and game spectators 108, are described as being "players" and "spectators," it should be appreciated that the game player 104 and game spectator 108 are not limited to being individuals but may refer to a game client, apparatus, or device, in singular and plural forms. The game player 104 and game spectator 108 may each be any entity or device which connects with the game server 102 or the web server 110 via the network 106. For example, the game player 104 and game spectator 108 may each be the same or similar to the computer system 200 of FIG. 2, including similar elements and features or combinations thereof.

The game server 302, the rendering server 304, and the broadcaster 306 of the game system 102 may be disparate structures which are directly or indirectly connected via any of the networks described herein. In this regard, the structures may be physical, tangible structures. Any combination of these structures may be integral or non-integral with one another. They may also comprise non-tangible structures in further embodiments of the present disclosure. For example, the broadcaster 306 may be implemented via software and included within either of the game server 302, the rendering server 304, or a combination thereof.

The game server 302 executes and manages a game processing program for progressing the network game, instructs the rendering server 304 to perform an image rendering process, requests the spectator input information, and exchanges game data with the game player 104. In other words, the game server 302 executes and manages game processing of the network in which the game player 104 participates and the game spectator 108 spectates. For example, the game server 302 manages game information such as a position and direction on a map of a character, or characters, operated by the game player 104, and an event, or events, to be provided for each character. The game information may include character information which reflects a current status of the game player 104 or character controlled thereby. The game information may also include progress information which reflects a current status of the network game or service. The game server 302 also manages the player input information and the spectator input information for controlling the network game. The game information, including the player input information and the spectator input information, may comprise or relate to any information which is understood to be associated with a network game or other service.

The game server 302 exchanges the game information with the rendering server 304 and causes the rendering server 304 to generate a player game screen for the game player 104. For example, when the player input information is received by the game server 302 from the game player 104 via the network 106 as a result of an operation input of the game player 104 or when the spectator input information is received from the web server 110 via the network 106, the game server 302 executes a process of reflecting these pieces of information on the character information of any character or characters of the game player 104 and on the environmental and other information of the network game. Then, the game server 302 determines at least one rendering object to be rendered on the player game screen based on the information of the network game, and transmits a rendering instruction to the rendering server 304.

The rendering server 304 renders the player game screen in accordance with the rendering instruction received from the game server 302, and outputs the generated player game screen directly to the game player 104 or indirectly to the game player 104 via the game server 302. The rendering server 304 can simultaneously form player game screens for multiple game players 104. Alternatively, the rendering server 304 can sequentially form player game screens multiple game players 104. Of course, the rendering server 304 may also perform any combination of simultaneously and sequentially forming player game screens.

The rendering server 304 executes a game screen rendering process by a graphics processing unit based on information received from the game server 302 for the player game screen. The rendering server 304 may execute the game screen rendering process based on identification information of rendering objects contained in the player game screen, and detailed information indicating data necessary to render each rendering object. The detailed information necessary to render each rendering object may include, but is not limited to, information indicating the following attribute data: identification information for specifying model data; identification information for specifying texture data; specific information of a rendering program, for example, a shader, to be used; and specific information of data for calculations, for example, the light source intensity, light source vector, and rotation matrix, to be used in the rendering program. The detailed information including the above-listed information may be transmitted from the game server 302 to the rendering server 304, but information to be contained in the detailed information is not limited to the above information. For example, the detailed information may contain any of the above-listed information, and may additionally or alternatively contain any information to be used in the process of rendering a rendering object as generally understood in the art.

The player game screen, which is rendered by the rendering server 304 in accordance with the transmitted rendering instruction including the rendering object identification information and detailed information, is transmitted to the game player 104. The game player 104 may directly receive the player game screen from the rendering server 304, or the game player 104 may indirectly receive the player game screen from the rendering server 304 such as by way of the game server 302 or by any other entity. Thus, the game system 102 of FIG. 2 can generate the player game screen corresponding to operation input caused on a client device, and provide the player game screen to the game player 104 via the network 106. As a result, any graphic processing capabilities or requirements of the game player 104 for participating in the network game may be minimized or eliminated altogether.

In addition to rendering the player game screen, the rendering server 304 may also render a spectator game screen, which is included within a broadcast of the network game and viewable by the game spectator 108. The game server 302 similarly exchanges game information with the rendering server 304 for causing the rendering server 304 to render the spectator game screen. The rendering server 304 generally renders the spectator game screen in a same or similar manner as the player game screen. Exemplary embodiments by which the rendering server 304 renders the spectator game screen are discussed in detail below. As an alternative to rendering the spectator game screen, the game server 302, the rendering server 304, or a combination thereof may utilize the player game screen as the spectator game screen.

The game system 102 of FIG. 3 is shown as including one game server 302 and one rendering server 304. Nevertheless, those of ordinary skill in the art will appreciate that the present disclosure is not limited to this arrangement. For example, it is also possible to allocate one rendering server 304 to a plurality of game servers 302, or to allocate a plurality of rendering servers 304 to a plurality of game servers 302. In further embodiments, the game system 102 may include separate rendering servers 304 for rendering the player game screen and for rendering the spectator game screen. Any rendering servers 304 may be specifically associated with any game server 302 or any game screen. Additionally or alternatively, the game server 302 may designate a rendering server 304 or a graphics processing unit of a rendering server 304 to be used to execute a rendering instruction, in accordance with information indicating a number of game screens to be simultaneously or sequentially generated by a rendering server 304 or graphics processing unit of a rendering server 304.

The spectator game screen is transmitted directly or indirectly to the broadcaster 306 from the rendering server 304. The broadcaster 306 receives and transmits the spectator game screen to the web server 110. The broadcaster 306 may process, encode, compress, and/or output the information to the web server 110 in accordance any known formats and/or teachings commonly understood in the art. In this regard, any output of the broadcaster 306 may only be limited by the graphic processing capabilities of the rendering server 304, as well as possibly being restricted by any downstream limitations of the web server 110, game spectator 108, or network 106. Nevertheless, the output of the broadcaster 306 may be independent of any processing and display capabilities of the game player 104.

The web server 110 receives the output of the broadcaster 306 and is accessible by the game spectator 108. The web server 110 may comprise a server, platform, application, website, or any other interface which is configured to process, decode, and/or broadcast images or video streams via a public, private, or other medium. The web server 110 may also be configured to receive inputs from the game spectator 108 and to transmit the inputs to the game server 302.

Exemplary embodiments of the components of the game system 102 of FIG. 3 are described below with respect to FIGS. 3-5.

Figure 4:
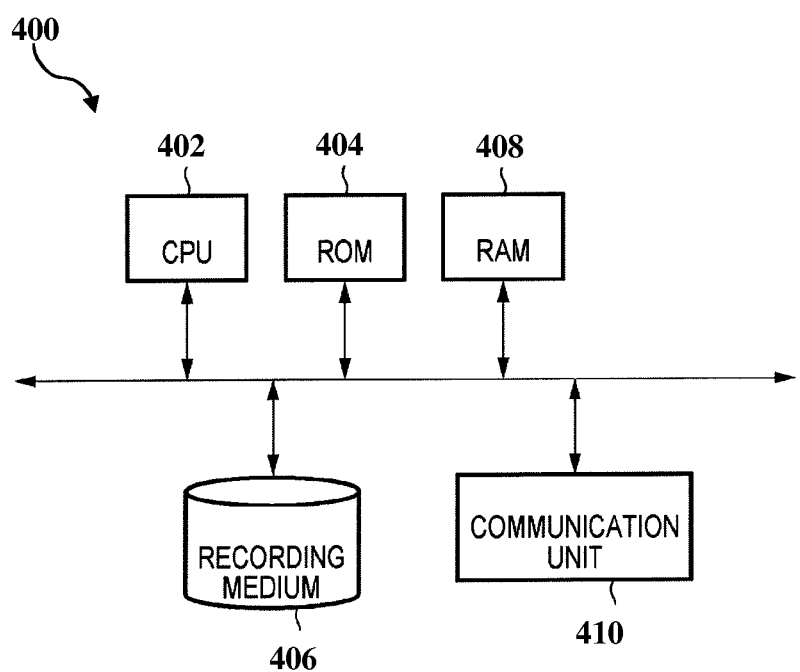
FIG. 4 shows a block diagram of an exemplary game server, according to an aspect of the present disclosure.

FIG. 4 is a block diagram showing an exemplary functional arrangement of the game server 302 according to an embodiment of the present disclosure. The game server 302 may be, for example, a game server system as generally shown at 400 in FIG. 4. However, it is to be appreciated that the game server 302 may also be the same or similar to the computer system 200 of FIG. 2. The game server 302 may comprise any combination of the components of the computer system 200 and the game server system 400.

A game CPU 402 controls the operation of each block of the game server system 400. More specifically, the game CPU 402 reads out a game processing program from, for example, a game ROM 404 or game recording medium 406, expands the program on a game RAM 408, and executes the program, thereby controlling the operation of each block. The game CPU 402 may be the same or similar to the processor 204 as described with respect to FIG. 2.

The game ROM 404 may be the same or similar to the main memory 206 of FIG. 2. For example, the game ROM 404 may be a programmable nonvolatile memory. The game ROM 404 stores the game processing program, and may also store other programs. The game ROM 404 also stores information such as a constant required for the operation of each block of the game server 400.

The game RAM 408 may be the same or similar to the static memory 208 of FIG. 2. For example, the game RAM 408 may be a volatile memory. The game RAM 408 is used not only as a game processing program expansion area, but also as a storage area for temporarily storing, for example, intermediate data output during the operation of each block of the game server 400.

The game recording medium 406 is, for example, a recording device such as an HDD detachable from the center server 400. The game recording medium 406 may be the same or similar to the disk drive unit 220 or the computer-readable medium 224 of FIG. 2. In this embodiment, the game recording medium 406 is used as, for example, a database for managing users and client devices using the network game, and a database for managing various kinds of information on the network game, which are required to generate the player game screens to be provided for each connected game player 104 and to generate the spectator game screen to be provided for the game spectator 108.

A game communication unit 410 is a communication interface of the game server system 400. The game communication unit 410 may be the same or similar to the network interface device 222 of FIG. 2. The game communication unit 410 exchanges data with the game player 104, the rendering server 304, the broadcaster 306, and the web server 110. The game communication unit 410 may convert data into a data format complying with any necessary or required communication specifications.

Figure 5:
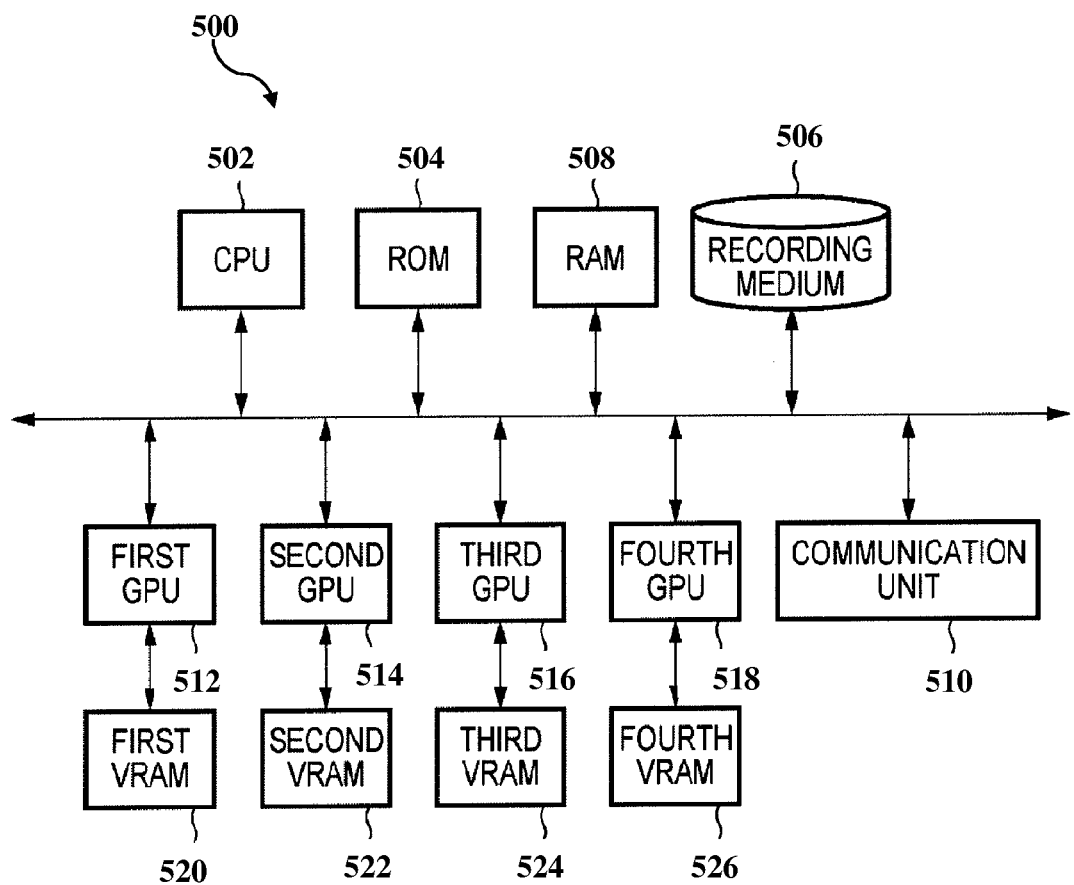
FIG. 5 shows a block diagram of an exemplary rendering server, according to an aspect of the present disclosure.

FIG. 5 is a block diagram showing an exemplary functional arrangement of the rendering server 304 according to an embodiment of the present disclosure. The rendering server 304 may be, for example, a rendering server system as generally shown at 500 in FIG. 5. However, it is to be appreciated that the rendering server 304 may also be the same or similar to the computer system 200 of FIG. 2. The rendering server 304 may comprise any combination of the components of the computer system 200 and the rendering server system 500.

A rendering CPU 502 controls the operation of each block of the rendering server system 500. More specifically, the rendering CPU 502 reads out a rendering process operation program stored in a rendering ROM 504 or rendering recording medium 506, expands the program on a rendering RAM 508, and executes the program, thereby controlling the operation of each block. The rendering CPU 502 may be the same or similar to the processor 204 as described with respect to FIG. 2.

The rendering ROM 504 may be the same or similar to the main memory 206 of FIG. 2. For example, the rendering ROM 504 may be a programmable nonvolatile memory. The rendering ROM 504 stores the rendering process operation program, other operation programs, and information such as a constant required for the operation of each block of the rendering server system 500.

The rendering RAM 508 may be the same or similar to the static memory 208 of FIG. 2. For example, the rendering RAM 508 may be a volatile memory. The rendering RAM 508 is used not only as an operation program expansion area, but also as a storage area for temporarily storing, for example, intermediate data output during the operation of each block of the rendering server system 500.

The rendering recording medium 506 is, for example, a recording device such as an HDD detachable from the rendering server system 500. The rendering recording medium 506 may be the same or similar to the disk drive unit 220 or the computer-readable medium 224 of FIG. 2. In this embodiment, the rendering recording medium 506 may store the following data to be used to generate the game player screen and the spectator player screen: model data; texture data; a rendering program; and data for calculations to be used in the rendering program. Of course, the above-listed data is merely exemplary and not limiting or exhaustive. In additional embodiments, the rendering recording medium 506 may store additional or alternative data without departing from the scope of the present disclosure.

A rendering communication unit 510 is a communication interface of the rendering server system 500. The rendering communication unit 510 may be the same or similar to the network interface device 222 of FIG. 2. The rendering communication unit 510 exchanges data with another apparatus, for example, the game player 104, the rendering server 304, and the broadcaster 306. When transmitting data, the rendering communication unit 510 may convert the data into a data transmission format determined with respect to a transmission network or a transmission destination apparatus, and transmits the data to the transmission destination apparatus. When receiving data, the rendering communication unit 510 may convert received data into an arbitrary data format readable by the rendering server system 500, and store the data in, for example, the rendering RAM 508.

First, second, third, and fourth rendering GPUs 512, 514, 516, and 518 each generate the player game screen to be provided for each game player 104 or the spectator game screen to be provided for the game spectator 108. Each rendering GPU 512, 514, 516, and 518 is connected to a video memory, such as first, second, third, and fourth rendering video RAMs (VRAMs) 520, 522, 524, and 526, as a game screen rendering area. Each rendering GPU 512, 514, 516, and 518 may also include a cache memory (not shown). When performing rendering on the connected rendering VRAM 520, 522, 524, and 526, each rendering GPU 512, 514, 516, and 518 expands a rendering object on the cache memory, and writes the mapped rendering object in the corresponding rendering VRAM 520, 522, 524, and 526. FIG. 5 shows one video memory being connected to each graphics processor. However, it is to be known and understood that the number of video memories connected to the graphics processors can be any arbitrary number. Moreover, FIG. 5 shows the rendering server system 500 as including four graphics processors. However, it is also to be known and understood that the graphics processors can be any arbitrary number.

Each of the broadcaster 306 and the web server 110 may comprise any combination of the components of the computer system 200, the game server system 400, and the rendering server system 500.

An exemplary embodiment of basic network game processing executed on the network game system 300 having the arrangement of the game server 302 and the rendering server 304 as described above is generally explained with reference to FIG. 6. The basic network game processing is generally shown at 600 and may be implemented by the game server 302 reading a corresponding processing program and executing the processing program, as described above with respect to FIG. 4.

The network game processing 600 may be started when, for example, the network game begins or the game server 302 is activated, and repetitively executed for each frame of the network game. In the network game processing 600, the game server 302 and the rendering server 304 are described as providing the player game screen for the game player 104. However, as will be evident from the disclosure below, similar processing may also be executed each frame for providing the spectator game screen to the broadcaster 306.

In step S602, the game server 302 determines whether information indicating an operation input caused on the game player 104, or any additional game players, is received and/or whether an operation input caused on the game spectator 108 is received. If the game server 302 determines that the information indicating any of the operation inputs is received, the game server 302 advances the process to step S604. If not, the game server 302 advances the process to step S606.

In step S602, the game server 302 updates game information based on the information indicating the operation input on the game player 104, which is received in step S602. For example, the game server 302 determines state information corresponding to a character in the network game, which is an operation target of a user of a corresponding game player 104. The character state information is information of the action and appearance of the character that may be changed by the user's operation, for example, the position (e.g., coordinate information) of the character on the map, the gazing direction of the character, and a character's action. The game server 302 refers to the received operation input information, and updates a parameter that changes by the operation input, among parameters contained in the state information, by the received operation input information. Accordingly, the game server 302 can reflect, in the network game, the information of the operation input performed by the game player 104.

In step S606, the game server 302 updates state information of a rendering object as a state management target in the network game, except for the character as an operation target of the game player 104. Examples of the rendering object as a state management target in the network game may be a non-player character that is not a target of a user's operation, and a background object such as a landform. A rendering object as a state management target in the network game changes with time or by the action of a character as a user's operation target. In step S606, therefore, the game server 302 updates the state information of a rendering object as a state management target in the network game, in accordance with the elapse of time or the character state information updated in step S604.

In step S608, the game server 302 specifies rendering objects contained in the player game screen provided for the game player 104. The rendering objects contained in the player game screen may include a character's rendering object as a user's operation target as identified in S604, and a rendering object as a state management target in the network game as identified in S606. In other words, the game server 302 selects each game player 104 presently connected to the game server 302, and reads information of a player game screen rendering range with which each game player 104 is associated. The information of the game screen rendering range may include, for example, camera parameters corresponding to the player game screen.

In step S610, the game server 302 transmits, to the rendering server 304, instructions to render the player game screen to be provided for the game player 104, and causes the rendering server 304 to execute rendering processing. The game server 302 may transmit instructions for all game players 104, or for less than all game players 104. The instructions may be simultaneously, sequentially, or serially transmitted. The instructions may include, for each game player 104, identification information for the game player 104, the rendering objects contained in the player game screen, detailed information set for each of the rendering objects contained in the player game screen, state information of each rendering object contained in the player game screen, and information of the rendering range and display setting of the player game screen.

Figure 6:
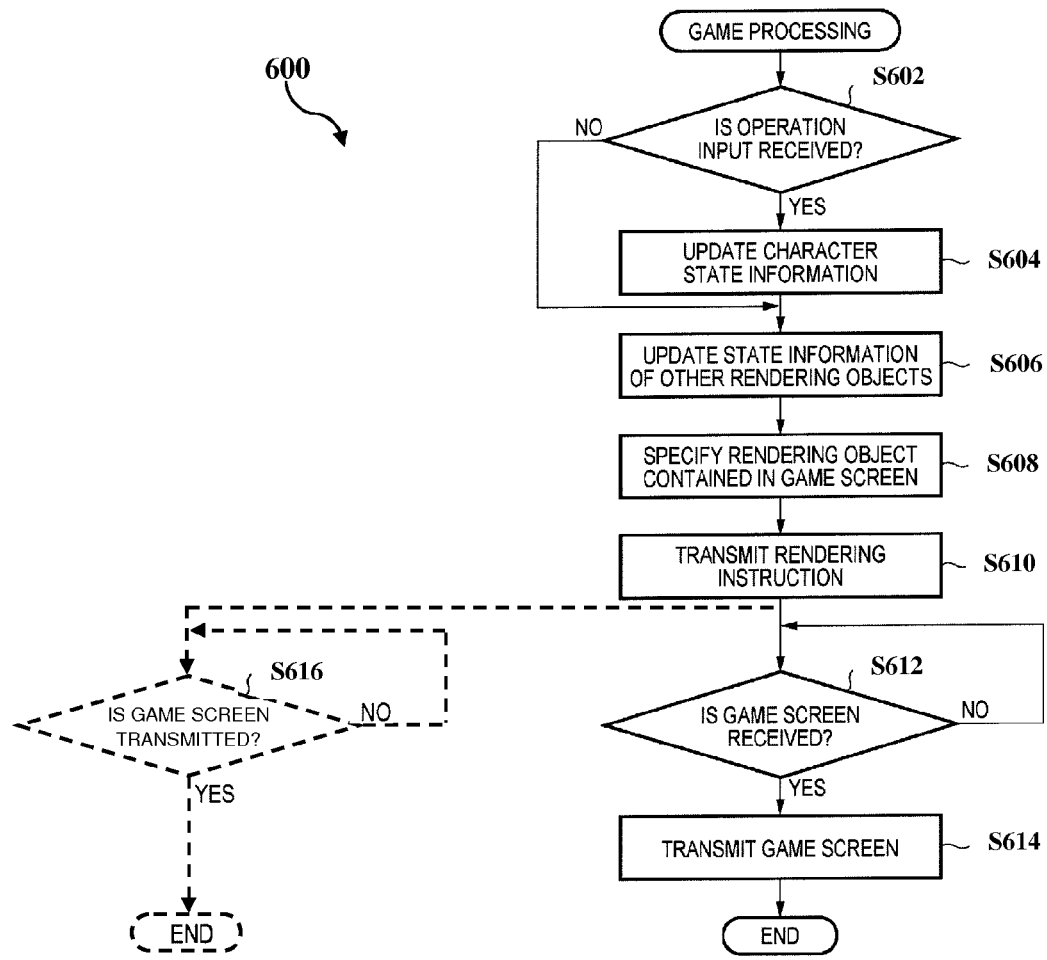
FIG. 6 shows a flowchart of an exemplary network game process, according to an aspect of the present disclosure.

In an embodiment of the network game processing 600 as shown in FIG. 6, at step S612, the game server 302 may determine whether a player game screen generated by the rendering server 304 in accordance with a rendering instruction is received from the rendering server 304. If it is determined that the player game screen is received, the game server 302 advances the process to step S614 and transmits the player game screen to the game player 104. If the player game screen is not received at step S612, the game server 302 waits until the player game screen is received. The game server 302 may wait until all of the player game screens are received, such that the player game screens of all game players 104 are transmitted at a same time. Alternatively, the game sever 202 may transmit each player game screen as it is received.

In an alternative embodiment of the network game processing 600 as shown in FIG. 6, the rendering server 304 may transmit the player game screen to the game player 104. In this regard, the game server 302 may determine whether the player game screen has been transmitted at step S616. For example, the game server 302 may determine whether the player game screen has been transmitted by receiving a confirmation from the rendering server 304. In even further embodiments of the present disclosure in which the rendering server 304 transmits the player game screen to the game player 104, the game server 302 does not receive any confirmation and the network game processing 600 may end after step S610. In accordance with the above embodiments, the rendering server 304 may also transmit player game screens to all game players 104 at a same time or as the player game screens are rendered.

The network game processing 600 of FIG. 6 is merely an exemplary method of a configuration of the game server 302 and the rendering server 304. Additional and alternative embodiments of the network game processing 600 may be provided without departing from the scope of the present disclosure. The shown embodiment is merely exemplary and should not be considered limiting.

Figure 7:
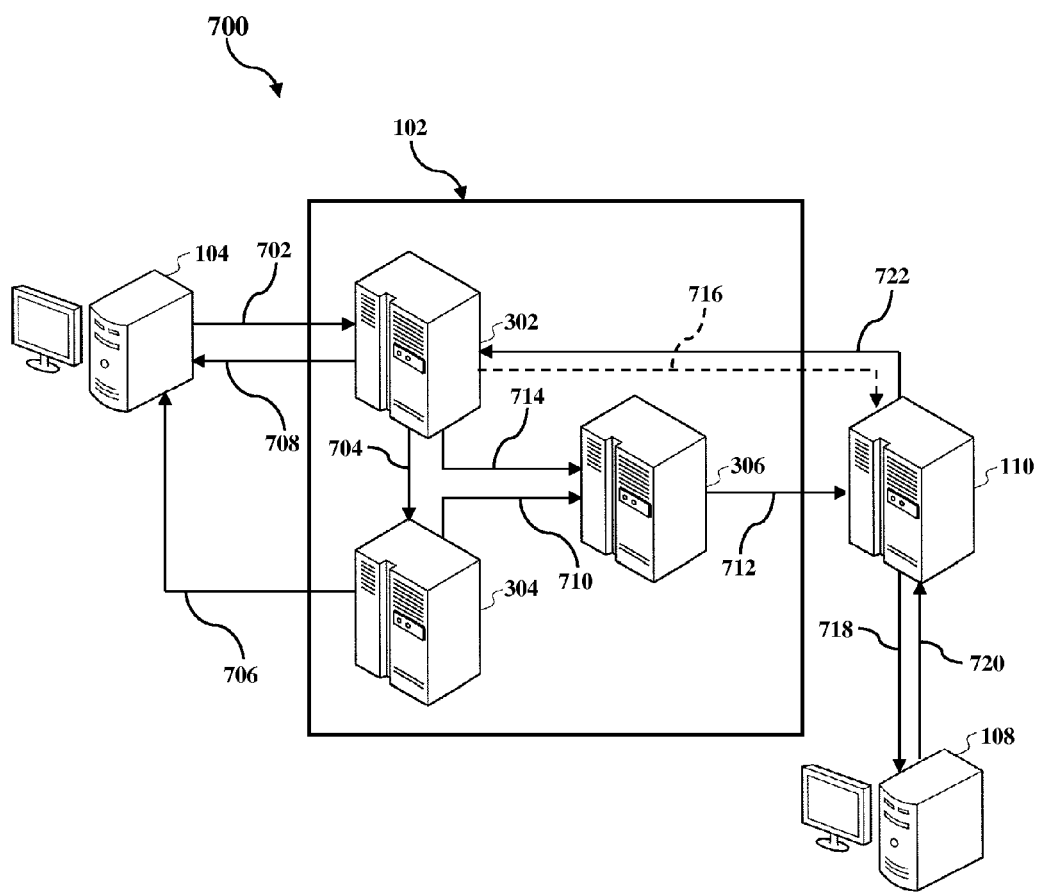
FIG. 7 shows a schematic of an exemplary system for controlling a network game in accordance with an input of a game spectator, according to an aspect of the present disclosure.

FIG. 7 shows a schematic of the network game system 300 of FIG. 3 at 700. The game server 302 includes at least one memory, such as the memories 206, 208, 224 of FIG. 2 or the memories 404, 406, 408 of FIG. 4, which includes a game program including a set of instructions. The game program is configured to be executed by at least one processor, such as the processor 204 of FIG. 2 or the CPU 402 of FIG. 4, for performing operations in accordance with any of the features described herein. The game server 302 transmits and receives information amongst the entities shown in FIG. 7 for performing the operations described herein and progressing the network game. The game server 302 may transmit and receive the information via a network interface, such as the network interface device 222 of FIG. 2 or the communication unit 410 of FIG. 4. The game player 104 is connected to the game server 302 for participating in the network game.

The game server 302 receives player input information 702 from the game player 104, updates the game information based on the player input information 702, and issues a rendering instruction 704 to the rendering server 304 as generally discussed above.

The rendering instruction 704 may comprise an instruction to render a single player game screen for the game player 104, or the rendering instruction 704 may comprise an instruction to render multiple game screens for multiple players. In this regard, the rendering server 304 may render a different game screen for each of the multiple players. Alternatively, the rendering server 304 may render a same game screen for the multiple players. For example, when the network game includes a group of characters which cooperate as a party, the rendering server 304 may render a same game screen for the players which control the characters of the party. In any event, the rendering server 304 is configured to render the player game screen for the game player 104, or for multiple game players 104, based on the rendering instruction 704 received from the game server 302.

The rendering server 304 receives the rendering instruction 704, including the necessary game information, from the game server 302 and generates the player game screen. The player game screen is transmitted to the game player 104 as video information 706 for display by the game player 104. In the embodiment shown in FIG. 7, the rendering server 304 provides the video information 706 directly to the game player 104. The rendering server 304 may transmit the video information 706 to the game player 104 via the network 106 (not shown). The video information 706 may be transmitted to the game player 104 as a unicast transmission or communication. The game server 302 may separately provide audio information 708 to the game player 104. The game server 302 may also transmit the audio information 708 to the game player 104 via the network 106 (not shown). The audio information 708 may also be transmitted to the game player 104 as a unicast transmission or communication. Of course, those of ordinary skill in the art appreciate that, in alternative embodiments of the present disclosure as generally discussed with respect to FIG. 6, the rendering server 304 may provide the video information 706 to the game server 302, whereupon the game server 302 provides the video information 706 and the audio information 708 to the game player 104.

The rendering instruction 704 provided by the game server 302 to the rendering server 304 may further include an instruction for generating or rendering a spectator game screen. The spectator game screen is generated or rendered such that the game spectator 108 may watch or view the network game without participating therein. While the game player 104 participates in the network game and may control a player character of the network game, the game spectator 108 does not participate in the network game and may not control any player character of the network game. In this regard, the game spectator 108 is not connected to the game server 302 or the game system 102, and the game spectator 108 does not receive any game information directly from the game server 302, the rendering server 304, or the game system 102.

While the game player 104 includes or executes a game client for participating in the network game, the game spectator 108 does not include or execute the game client. The game client may be any piece of software which connects to the game system 102 for participating in the network game. The game client may facilitate or comprise an interface for exchanging information between the game player 104 and the game system 102, including the game server 302 and the rendering server 304. The game client may, for example, facilitate the exchange of the player input information 702, the video information 706, the audio information 708, and/or any additional game data. The game client may be stored or installed by the game player 104. For example, the game client may be included within any combination of the main memory 206, static memory 208, drive unit 220, and computer readable medium 226 as described with respect to FIG. 2. The game client may additionally or alternatively be accessed remotely by the game player 104. For example, the game client may be accessed by the game player 104 via the network 106 (not shown) and stored in a cloud computing system or managed by the game system 102. In these embodiments, the game player 104 may access a website for executing the game client. Of course, the above description is merely exemplary and the game client may comprise any additional or alternative embodiments or features as understood in the art. In any event, information of the network game is accessible to the game player 104 via the game client, whereas information of the network game, including the spectator game screen, may only be accessible to the game spectator 108 via the web server 110 or an alternative distribution mechanism as the game spectator 108 does not include or execute the game client. As a result, the game spectator 108 need not obtain, own, or access the game client for viewing the network game.

The spectator game screen may be managed by the game server 302 and controlled via the rendering instruction 704. In an embodiment of the present disclosure, the game server 302 may manage the spectator game screen by executing a game process as generally shown at 800 in FIG. 8. That is, a spectator game screen management process may be initialized at step S802. The process may be initialized when the network game is initiated, when game play is started, or when the game server 302 is activated. After initialization, the game server 302 may determine whether a spectator mode of the network game is enabled at step S804. If the spectator mode is enabled, the game server 302 may create a dummy player or fake client which is not controlled by any game player 104 at step S806. The game server 302 may create and manage the dummy player in a database in a same or similar manner as the game player 104. After creation of the dummy player at step S806, game processing of the network game is resumed at step S808 in accordance with normal game processing, for example, as described with respect to FIG. 6.

Figure 8:
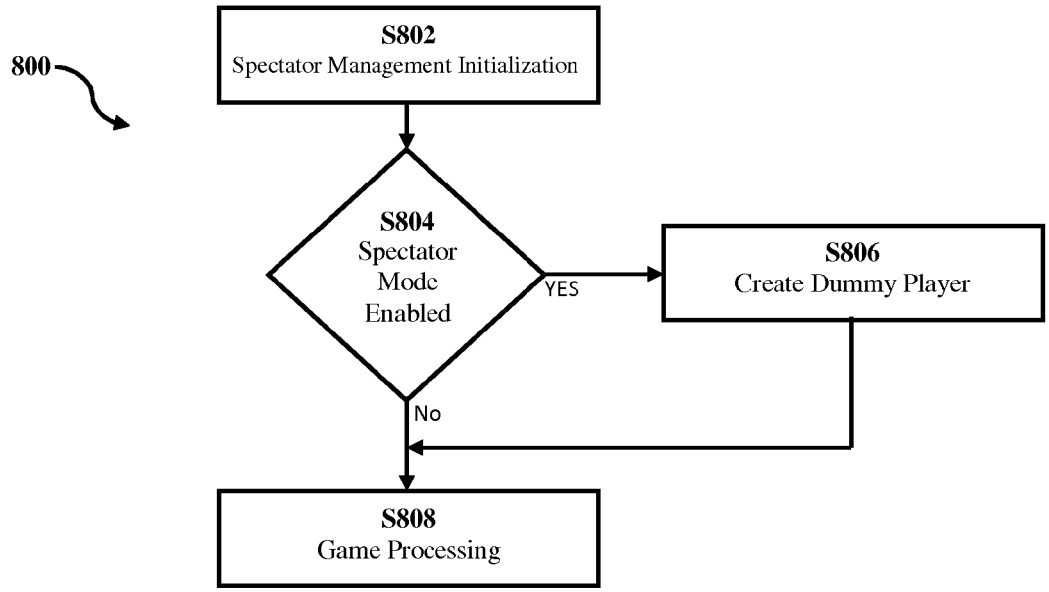
FIG. 8 shows a flowchart of an exemplary game process for creating a dummy player for generating a spectator game scream, according to an aspect of the present disclosure.

According to the spectator game screen management process 800 of FIG. 8, the game server 302 manages the spectator game screen as corresponding to the dummy player. As a result, the game server 302 may transmit a similar, or same, rendering instruction 704 to the rendering server 304 for generating the spectator game screen in correspondence with the dummy player as if transmitting the rendering instruction 704 to the rendering server 304 for generating the player game screen of the game player 104. In other words, the rendering instruction 704 for generating the spectator game screen need not be distinguishable, different, or separate from the rendering instruction 704 for generating the player game screen. Thus, any physical structure or functionality of the rendering server 304 need not be altered or modified for generating the spectator game screen.

The game server 302 may create the dummy player at step S806 in correspondence with a fixed reference point in the network game. That is, the game server 302 may create the dummy player as having a fixed position (e.g., coordinate information) on a game map or in a game space or environment. The game server 302 may additionally or alternatively create the dummy player as having a fixed gazing direction or viewing angle.

In further embodiments of the present disclosure, the game server 302 may create the dummy player as having a fixed position (e.g., coordinate information) on the game map or in the game space or game environment, while having a variable gazing direction or viewing angle. The variable viewing angle or direction may be configured in accordance with a predetermined pattern or based on predetermined rules. For example, the predetermined pattern may be set to continuously pan the game space or game environment from a left-to-right direction, or vice-versa, in a sweeping manner. The predetermined rules may be set, for example, such that the viewing angle or direction follows a closest character or a winning character. The predetermined rules may additionally or alternatively be set based on a priority of events in the network game. For example, viewing a battle may take precedence over viewing a conversation. Of course, the above examples are merely exemplary and are not limiting or exhaustive.

In even further embodiments of the present disclosure, the game server 302 may create the dummy player as having a variable position (e.g., coordinate information) on the game map or in the game space or game environment, while having either a fixed or variable gazing direction or viewing angle. The variable position of the dummy character may be configured to move throughout the game space or the game environment in accordance with a predetermined pattern or in association with predetermined events or conditions. The predetermined pattern may be repetitive or arbitrary to enhance variety and spectator interest. The predetermined events or conditions may include being offset a predetermined distance from a position of the game player 104 or any additional player, such as a winning player. The predetermined events or conditions may also include events in the network game, such as battles or conversations. In this regard, the dummy character may be configured to follow the events based on priority. For example, the dummy character may be configured to follow battle events in priority to conversations. Once again, those of ordinary skill in the art will appreciate that the above examples are exemplary and are not limiting or exhaustive. In such embodiments in which the position of the dummy character is variable, the game program may cause the game server 302 to receive the movements of the dummy character as the player input information 702 pursuant to step S602 of the game processing 600 of FIG. 6. As a result, the game server 302 may update the character state information of the dummy character at step S604 in similarity with updates to the character state information of the game player 104.

In additional embodiments of the present disclosure, the game server 302 may create the dummy player at step S806 in correspondence with an animate or inanimate object of the network game. For example, the game server 302 may create the dummy player in correspondence with a sun, moon, star, or bell tower. According to such an embodiment, the spectator game screen, as viewed by the dummy player, may be provided as an overhead view of the game space or game environment without requiring additional computations for determining a position of the dummy player. The game server 302 may further create the dummy player in correspondence with an object in the network game, such as an enemy character or animal. By this means, the spectator game screen may be moved within the game space or game environment while minimizing computations and maintaining a natural look and feel of the network game. An interest of the game spectator 108 will also be enhanced by providing a feeling of participation within the network game. Once again, the above examples are merely exemplary and are not limiting or exhaustive. In accordance with these embodiments, the game program may cause the game server 302 to receive information of the animate or inanimate objects as the player input information 702 pursuant to step S602 of the game processing 600 of FIG. 6. Alternatively, the game server 302 may replicate or copy the state information of the animate or inanimate objects from processing performed pursuant to step S606 of the game processing 600 of FIG. 6.

In the above-described exemplary and non-limiting embodiments, the spectator game screen is generally managed by the game server 302 so as to be different than the player game screen of the game player 104. The spectator game screen may comprise a global view of the network game, and thus, the game spectator 108 need not specifically follow or have loyalty to the game player 104. Thus, diversity and breadth of the game spectator 108 may be increased.

Nevertheless, the spectator game screen may also be the same or include a specific client view or the player game screen of the game player 104. According to such embodiments, the game server 302 may configure the dummy player to be the same as or similar to the game player 104. In this regard, the game program may cause the game server 302 to receive the player input information 702 of the game player 104 as the player input information 702 of the dummy player at S602 of the game processing 600 of FIG. 6. For example, the game program may store identification information of the game player 104 as identification information of the dummy player. When the player input information 702 is received which includes the identification information, the player input information 702 may be associated with the game player 104 and also with the dummy player, with the character state information of each of the game player 104 and the dummy player being updated in step S604. As a result, redundant rendering instructions 704 may be transmitted for generating each of the player game screen of the one of the game player 104 and the spectator game screen of the game spectator 108 at S610. Accordingly, the structure or functionality of the rendering server 304 need not be modified for accommodating the spectator game screen.

Alternatively, a same rendering instruction 704 may be transmitted for generating both the player game screen of the game player 104 and the spectator game screen of the game spectator 108 at S610. The rendering server 304 may generate a single game screen as both the player game screen of the game player 104 and the spectator game screen of the game spectator 108. According to such an embodiment, a processing load on the game server 302 may be reduced via duplication.

In the embodiments of the present disclosure in which the dummy player is configured to be the same or similar to the game player 104, the dummy player may be fixed to the game player 104 for a duration of the network game. In this regard, the game player 104 may be selected from among other players based on a ranking of the game player 104, a status or role of the game player 104 in the network game, a selection by the game spectator 108, or based on any other criteria which is known and understood in the art.

The dummy player need not, however, be fixed to the game player 104 for an entire duration of the network game. That is, a configuration of the dummy player may switch between different players, or between any of the other configurations of the dummy player described herein. For example, the rendering server 304 may generate the spectator game screen in correspondence with the game player 104 for a number of frames followed by a different player for a number of frames. The game server 302 may even create and manage multiple dummy players for generating multiple screens corresponding to multiple players at a same time. Accordingly, the broadcast of the network game, which comprises the spectator game screen, may stream views of multiple players simultaneously, consecutively, sequentially, serially, or otherwise. According to such embodiments, the game spectator 108 may watch or view multiple players, thereby creating further appeal and interest.

While the spectator game screen has been described above as being based on the creation and management of the dummy player, it should be understood that the spectator game screen may alternatively be or comprise any one or combination of the player game screens which are transmitted to the game players 104. In other words, the spectator game screen may comprise any one or combination of specific game player views. In this regard, the game server 302 need not create and manage the dummy character. Instead, any one or combination of the specific game player views which is generated by the rendering server 304 may also be the spectator game screen.

The rendering server 304 transmits the generated spectator game screen to the broadcaster 306 as rendering server broadcast information 710. The broadcaster 306 receives the rendering server broadcast information 710, processes, encodes, and/or compresses the information, and transmits the resultant data to the web server 110 as broadcast information 712. The broadcast information 712 may include only the rendering server broadcast information 710 received from the rendering server 304. Alternatively, the broadcaster 306 may also receive game server broadcast information 714 transmitted to the broadcaster 306 from the game server 302. The game server broadcast information 714 may include, for example, audio information of the network game. In this regard, the broadcaster 306 may receive video information from the rendering server 304 as the rendering server broadcast information 710, and receive audio information from the game server 302 as the game server broadcast information 714. The broadcaster 306 may merge the video information and the audio information in accordance with any known and understood methods or protocols. For example, the broadcaster 306 may merge the video information and the audio information in accordance with real time messaging protocol (RTMP), and transmit the resultant audio and visual stream to the web server 110 as the broadcast information 712. The broadcast information 712 generally comprises the broadcast of the network game.

The web server 110 receives the broadcast information 712 from the broadcaster 306, whereupon the web server 110 provides the broadcast of the network game to the game spectator 108.

The web server 110 may also receive a request for spectator input information which is to be displayed in connection with the broadcast. The request for the spectator input information is a request by the game system 102 for input from the game spectator 108. The request may be generated by the game server 302 and transmitted directly or indirectly to the web server 110. For example, the request may be transmitted from the game server 302 to the rendering server 304 in accordance with the rendering instruction 704. In this regard, the request may comprise a graphic or menu that is generated by the rendering server 304 in, or in association with, the spectator game screen. The request may then be transmitted from the rendering server 304 to the broadcast server 306 in accordance with the rendering server broadcast information 710, and output by the broadcast server 306 to the web server 110 as the broadcast information 712. Additionally, or alternatively, the request for the spectator input information may be transmitted from the game server 302 to the broadcast server 306 in accordance with the game server broadcast information 714. The broadcaster 306 may receive the request as a content source of the broadcast information 712, or the broadcast of the network game. The broadcaster 306 may combine or compile the request and the rendering server broadcast information 710, and output the resultant data or stream to the web server 110 as the broadcast information 712. In even further embodiments, the request for the spectator input information may be transmitted directly from the game server 302 to the web server 110 as a spectator input information request 716. In any event, the web server 110 receives the request for the spectator input information for display in association with the spectator game screen or the broadcast of the network game, such that the game spectator 108 may control the aspect of the network game.

The aspect of the network game which is controlled via the request may relate directly to the game player 104. The request may enable the game spectator 108 to directly help, hinder, or otherwise affect the game player 104, or a character controlled thereby, in the network game. For example, the request may enable the game spectator 108 to control a status of the game player 104, or a character controlled thereby, in the network game. The status may be controlled by, for example, raising or lowering a health or hit point or a maximum health or hit point of the game player 104 or character controlled thereby, placing the game player 104 or character controlled thereby in a predetermined state such as a frozen, invisible, fast, or slow state, or raising or lowering a level of the game player 104 or character controlled thereby. The request may further enable the game spectator 108 to control an ability of the game player 104, or a character controlled thereby, in the network game. The ability may be controlled by, for example, increasing or decreasing a power of an action of the game player 104 or character controlled thereby, making available or unavailable an action to the game player 104 or character controlled thereby, or making available or unavailable a turn or opportunity to the game player 104 or character controlled thereby. The request may even further enable the game spectator 108 to control a knowledge or inventory of the game player 104 or character controlled thereby. In this regard, the game spectator 108 may provide the game player 104 or character controlled thereby with an item, clue, map, information, or other element of the network game. Of course, these examples are merely exemplary and the game spectator 108 may directly control an aspect of the network game of the game player 104 in accordance with additional or alternative methods without departing from the scope of the present disclosure.

The aspect of the network game which is controlled via the request may additionally or alternatively relate indirectly to the game player 104. That is, the request may enable the game spectator 108 to indirectly help, hinder, or otherwise affect the game player 104 by controlling the aspect with respect to a friend character or enemy character of the game player 104. For example, when the spectator game screen corresponds to a specific client view of the game player 104, the request may enable the spectator to affect all friend characters or enemy characters which are displayed within the specific client view. As a result, the game spectator 108 may indirectly affect the game player 104 by controlling an aspect with respect to all friend or enemy characters which are viewable by the game spectator 108. This enables the spectator 108 to view the controlled aspect without affecting all characters in the network game space. The aspect of the network game which is indirectly controlled in relation to the game player 104 may include any aspect described above with respect to the game player 104 or any additional aspect of a network game which is known and understood.

Figure 9:
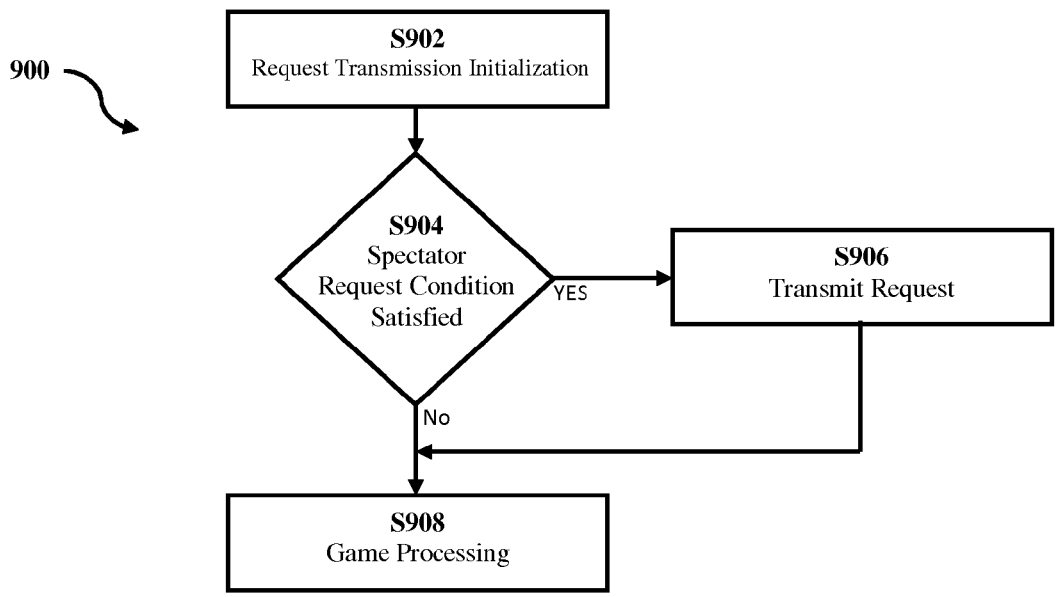
FIG. 9 shows a flowchart of an exemplary game process for generating and transmitting a request for spectator input information, according to an aspect of the present disclosure

The game server 302 may execute game processing as generally shown at 900 in FIG. 9 for transmitting the request for the spectator input information. The game server 302 undergoes spectator request transmission initialization processing at step S902. The spectator request transmission initialization processing step S902 may begin in accordance with each frame, a clock-cycle, as a result of the player input information 702 being received by the game server 302 from the game player 104, or based on any additional or alternative criteria. For example, the request for the spectator input information may be generated in correspondence with a view to which the spectator game screen is switched, with a content of the request also corresponding to the view or specific player view to which the spectator game screen is switched or initiated. As a result, interest in viewing the network game is preserved when the spectator game screen is switched. The spectator request transmission initialization processing step S902 may additionally or alternatively be performed in accordance with any of the additional features of the present disclosure, such as, but not limited to, when the rendering instruction 704 is transmitted from the game server 302 to the rendering server 304.

After initialization, the game server 302 determines whether a condition for transmitting the request for the spectator input information is satisfied at step S904. The condition may be related to any status or state of the network game as generally understood in the art. For example, the condition may be related to an event which is occurring or will be occurring in the network game. In other words, the condition may be related to a storyline of the network game. The condition may be preprogrammed or predetermined. For example, the condition may be satisfied in association with a predetermined event of the network game. The condition may also include a random or variable element. For example, the condition may be dependent on the spectator game screen. That is, the decision as to whether to request the spectator input information may depend on whether the aspect which is to be controlled is displayed by the spectator game screen. The game server 302 may decide to request the spectator input information to determine the effect of a relic which is discovered by a character which is displayed in the spectator game screen, but determine not to request the spectator input information to determine the effect of a relic which is discovered by a character which is not visible in the spectator game screen. In an additional example, the game server 302 may request control over an aspect of a battle which is occurring in the spectator game screen, but not request control over an aspect of a battle which is not occurring in the spectator game screen. According to these embodiments, spectator control may be limited to aspects which are viewed and of interest to the game spectator 108. Of course, these examples are merely exemplary and are not limiting or exhaustive. The game server 302 may determine whether to request control over any aspect of the network game in accordance with any additional conditions which are known and understood in the art without departing from the scope of the present disclosure.

If the spectator request condition is satisfied at step S904, the game server 302 generates and transmits the request for the spectator input information at step S906. As discussed above, the game server 302 may transmit the request for the spectator input information to the game server 304, the broadcaster 306, or the broadcast interface 110. The game server 304 may transmit the request in accordance with any known procedures and protocols.

Thereafter, game processing of the network game is resumed at step S908 in accordance with normal game processing, for example, as described with respect to FIG. 6. Additionally or alternatively, the game processing may reconfigure the dummy player or the spectator game screen to correspond to the request for the spectator input information, which was generated and transmitted by the game server 302. According to such an embodiment, the aspect which is to be controlled by the request may be made viewable to the game spectator 108 via the spectator game screen.

As discussed above, the web server 110 receives the request for the spectator input information, directly or indirectly from the game server 302, together with the broadcast information 712 output by the broadcaster 306. The web server 110 makes the request and the information available to the game spectator 108 as broadcast game information 718 of the network game, and has a functionality of distributing the broadcast game information 718 to the game spectator 108. The broadcast game information 718 which is made available to the game spectator 108 includes the broadcast of the network game which comprises the spectator game screen, as well as the request for the spectator input information. The broadcast game information 718 may also include any additional game information described herein, such as, but not limited to, character status information and network game state information. The web server 110 may comprise a single distribution interface, such as a website, or the web server 110 may comprise multiple distribution interfaces which comprise a content distribution or delivery network.

In any event, in the embodiment of the disclosure shown in FIG. 7, the web server 110 is an interface between the game system 102 and the game spectator 108. The game server 302, the rendering server 304, and the broadcaster 306 may not transmit any information or game data to the game spectator 108. The game server 302, the rendering server 304, and the broadcaster 306 also may not receive any information from the game spectator 108, including any inputs from the game spectator 108 in response to the request for the spectator input information. By this means, the web server 110 functions as a replacement for, and alternative to, the game client. The web server 110 may execute software or programming for connecting to the game system 102 or game server and relaying the spectator input information. However, the game spectator 108 need not execute the game client or communicate with the game system 102, including the game server 302, the rendering server 304, and the broadcaster 306.

The web server 110 may provide the broadcast game information 718 to the game spectator 108 via any known and understood methods. For example, the web server 110 may include a website or portal which the game spectator 108 may access via the network 106 for viewing the broadcast game information 718. In this regard, the web server 110 may live-stream the broadcast game information 718. Additionally or alternatively, the web server 110 may provide the broadcast game information 718 as a downloadable object or application. In any event, the web server 110 provides a medium for broadcasting or transmitting the network game to the game spectator 108, and may include any known content distribution network, system, server, or application which provides the broadcast game information 718 in accordance with any known protocol, format, or standard. The broadcast game information 718 may be transmitted to the game spectator 108 via a unicast transmission or a multicast transmission.

Figure 10:
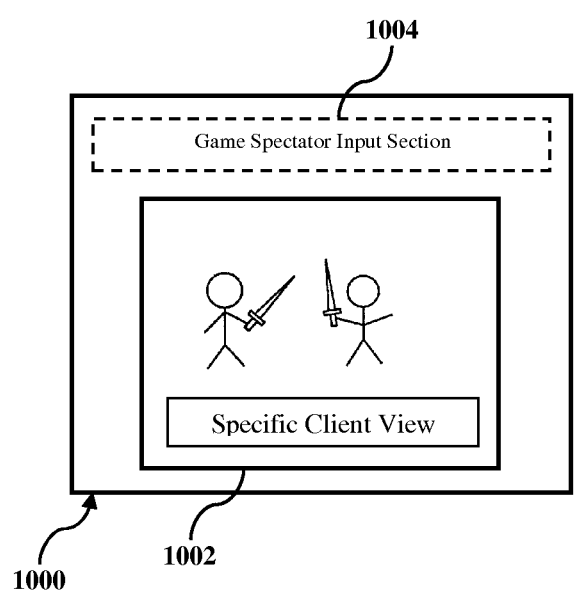
FIG. 10 illustrates an exemplary display screen for controlling a network game in accordance with an input of a game spectator, according to an aspect of the present disclosure.

An exemplary embodiment of the broadcast game information 718 is shown in FIG. 10. The broadcast game information 718 is shown as being displayed on a display screen 1000 of the game spectator 108, such as the video display device 212 as described with respect to FIG. 2. The display screen 1000 includes a broadcast 1002 of the network game, including the spectator game screen. The broadcast 1002 is shown in FIG. 10 as comprising a specific client view. The specific client view corresponds to the player game screen of the game player 104. Nevertheless, it should be understood that the broadcast 1002 may additionally or alternatively comprise any of the views discussed herein.

The display screen 1000 is shown as including a game spectator input section 1004. The game spectator input section 1004 may include a portion which describes the request for the spectator input information from the game server 302, and a portion which accepts a reply or input from the game spectator 108. The portion of the game spectator input section 1004 which accepts the reply or input from the game spectator 108 may accept a yes-or-no input, a multiple-choice input, an open-ended input, or any other input which is known in the art. In this regard, the request for the spectator input information may comprise a yes-or-no request, a multiple choice request, an open-ended request, or any other request which is known in the art. The game spectator input section 1004 may also receive a request for personal information from the game spectator 108. The request for personal information is described below. Of course, the display screen 1000 of FIG. 10 is merely exemplary and additional displays are available without departing from the scope of the present disclosure. For example, additional embodiments of the display screen 1000 may include multiple client views. In this regard, the broadcaster 306 may be configured to receive and compile multiple video sources for output to the web server 110 as the broadcast information 712, or the broadcaster 306 may be configured to receive and output multiple broadcasts to the web server 110. Even further embodiments of the display screen 1000 may include any game data which is received by the broadcaster 306. For example, the broadcaster 306 may be configured to receive and output menu data of the network game or the player input information 702 of the game player 104.

The broadcast of the network game is viewable to the game spectator 108 via the display screen 1000 such that the game spectator 108 may view the network game, learn from the operation of the game player 104, control the aspect of the network game of the game player 104, and experience any of the additional features and advantages described herein. The broadcast of the network game may be freely available to the game spectator 108, or the game spectator 108 may be required to complete an authentication or log-in process prior to viewing the broadcast of the network game.

For controlling the aspect of the network game of the game player 104, the game spectator 108 transmits spectator input information 720 to the web server 110. The spectator input information 720 is submitted in response to the request for the spectator input information, which is relayed to the game spectator 108 by the web server 110. While the request for the spectator input information has generally been described herein as a formal request, it should be understood that the request may comprise an opportunity or open invitation to submit the spectator input information 720. In other words, the spectator input information 720 need not be submitted in reply to any specific request. The spectator input information 720 may be submitted via a keyboard, mouse, touch-screen, controller, voice-recognition software, or any other input device or means which is understood in the art.

The spectator input information 720 includes a specification of the game player 104 and the aspect of the network game of the game player 104 to be controlled. For example, the spectator input information 720 may identify the game player 104 and indicate to increase a hit point of a player character controlled thereby. The spectator input information 720 may alternatively identify the game player 104 and indicate an item which is to be provided to a player character controlled thereby. The spectator input information 720 may alternatively identify the game player 104 and indicate an enemy character thereof which is to be frozen. Of course, these examples are merely exemplary and the aspect of the network game of the game player 104 which is to be controlled may include any of the embodiments described herein or which are known and understood in the art.

While the spectator input information 720 is described as including an identification of the game player 104, it should be understood that this information need not be provided by the game spectator 108. For example, the game server 302, rendering server 304, or broadcaster 306 may transmit identification information to the web server 110 which is included in or associated with the broadcast information 712. In this regard, when the broadcast of the network game is associated with the specific client view, the identification information may identify the game player 104 to which the specific client view corresponds. The web server 110 may maintain the identification information in association with the broadcast of the network game, and correlate the identification information with the received spectator input information 720. Accordingly, in the event that the game spectator 108 is watching a broadcast of the network game which is associated with a specific client view or game player 104, the game spectator 108 may not be required to provide identification information of the game player 104. That is, the game spectator 108 may be limited to only providing the spectator input information for the game player 104 to which the broadcast corresponds. Nevertheless, it should be understood that in further embodiments of the present disclosure, such as when the broadcast of the network game corresponds to a global view, the game spectator may provide the identification information of the game player 104.

The spectator input information 720 may also include personal information of the game player 108. The personal information may comprise identification or user information of the game spectator 108, payment or financial information, or any other information commonly known and understood in the art. The identification or user information may be required to prevent malicious or unwarranted inputs from the game spectator 108. The identification or user information may also be required to develop user interest and loyalty. For example, the identification or user information may be associated with a ranking or level of the game spectator 108. The ranking or level may determine the aspects of the network game which the game spectator 108 is able to control, such as the game spectator 108 may require a first ranking or level for controlling an aspect directly with respect to the game player 104 and a second ranking or level being higher or lower than the first ranking or level for controlling an aspect with respect to friend or enemy characters of the game player 104. The ranking or level may also determine a magnitude of the aspect which the game spectator 108 is able to control. For example, a higher ranking may enable the game spectator 108 to provide additional items or higher increases in status or hit points to the game player 104. Of course, these examples are merely exemplary and are not exclusive or exhaustive.

The personal information may additionally or alternatively include payment information to prevent malicious or unwarranted inputs and to also limit a total number of inputs received by the web server 110 or the game system 102. The payment information may require a fixed payment amount per input, or the payment information may be a variable payment amount depending upon a status of the network game or the nature of the aspect to be controlled. The payment amount may increase in accordance with the examples described with respect to the ranking or level of the game spectator 108 described in the preceding paragraph. The payment amount may also increase during a predetermined event, such as a battle, or the payment amount may increase in accordance with a status of the game player 104, such as a hit point of a character controlled by the game player 104. That is, the payment amount may increase when a hit point of the game player 104 approaches zero or is below other predetermined threshold values. The payment amount may linearly increase with the status of the game player 104, or the payment amount may incrementally increase when the status is above or below the predetermined threshold values. The payment amount may correspond to real-world currency, or the payment amount may correspond to a virtual currency which is accumulated by participating in the network game or in another network game hosted by the game server 102. Requiring the virtual currency which is accumulated by participating in the network game would foster a sense of community amongst the game players 104 of the network game, whereupon the game players 104 may reciprocally assist one another in the network game by being game spectators 108.

Upon receipt of the spectator input information 720 from the game spectator 108, the spectator input information 720 is transmitted from the web server 110 to the game server 302, or the game system 102. In this regard, the spectator information 702 may be configured to be received by the web server 110 from the game spectator 108 or transmitted from the web server 110 to the game server 302 at a predetermined timing or at an arbitrary timing during a progress of the network game. That is, the request for the spectator input information may be valid for a predetermined time period or set to expire at a specific timing. The spectator input information 720 may be received by the web server 110 during the time period or before the expiration of the specific timing. The spectator input information 720 may be transmitted from the web server 110 to the game server 302 upon the expiration of the time period or at the specific timing. By this means, a plurality of game spectators 108 may provide the spectator input information with equal opportunity, or the spectator input information may be set to be received for a predetermined event or timing in the network game. Any timing for providing the spectator input information may be provided to or hidden from the game spectator 108.

Alternatively to the above, the spectator input information 720 may be configured to be received by the web server 110 from the game spectator 108 or transmitted from the web server 110 to the game server 302 at an arbitrary timing during a progress of the network game. In other words, the game spectator 108 may provide the spectator input information at any timing during the network game. For example, the game spectator 108 may be provided with a fixed or constant request for providing the game player 104 with a healing portion or for increasing a status of the game player 104 during the network game, whereupon the game spectator 108 may provide the healing portion or increase the status of the game player 104 at any time during the network game. Additionally or alternatively, a request to provide the game player 104 an item or game information may be constantly issued during the network game, whereupon the game spectator 108 may elect to provide the game player 104 with the item or the game information at any time during the network game. The item or the game information may be constant throughout the game, or the item or the game information may be variable. For example, the item or the game information may change upon being provided to the game player 104, in accordance with a scenario of the network game, or based upon an expiration of a specific time period.

The web server 110 receives the spectator input information 720 from the game spectator 108 and transmits the spectator input information 720 to the game server 302, or the game system 102, as spectator input information 722. In this regard, the web server 110 may determine whether an input condition is satisfied before transmitting the spectator input information 722 to the game server 302. For example, the web server 110 may verify or authenticate any personal information, including the identification or user information or the payment or financial information, of the spectator input information 720 before transmitting the spectator input information 722. Alternatively, the web server 110 may transmit the spectator input information 722 upon the expiration of a predetermined time period or a specific timing of the request. In any event, the web server 110 transmits the spectator input information 720 to the game server 302 as the spectator input information 722, such that the game server 302 may control the aspect of the network game of the game player 104 in accordance with the spectator input information 722.

The game server 302, or the game system 102, receives the spectator input information 722 from the web server 110 and determines the game player 104 and the aspect of the network game of the game player 104 to be controlled therefrom. The game server 302 may immediately control the aspect of the network game of the game player 104 upon receipt of the spectator input information 722. Since the aspect is controlled in real-time, the aspect of the game which is controlled may comprise a latent feature of the network game. This may enhance the viewing opportunity of the game spectator 108 by providing immediate gratification for any spectator input information 720.

Alternatively to the above, the game server 302 may await expiration of any of the above-discussed time periods or timing before executing the spectator input information 722. Additionally or alternatively, the game server 302 may provide the game player 104 with an option of accepting the spectator input information 722 and having the aspect of the network game controlled in accordance with a reply to the option. The game server 302 may transmit the option to the game player 104 based on the spectator input information 722 received from the web server 110, and control the aspect of the network game of the game player 104 in response to the game player 104 accepting the option. The option may be provided to the game player 104 solely for confirming that the game player 104 desires the aspect to be controlled accordingly. Alternatively, the game player 104 may be penalized for accepting the option. For example, if the aspect of the network game which is to be controlled includes adding an item to an inventory of the game player 104, the penalty may include a reduction in a hit point of the game player 104. A status of the game player 104 in the network game may be negatively or adversely be affected by the penalty, or a general status of the game player 104 may be affected with respect to, but not in, the network game. For example, a ranking or level of the game player 104 may be adversely affected by accepting the option. According to such embodiments, the game player 104 is able to weight any benefits of accepting the spectator input information 722 with the penalty.

Accordingly, as generally shown in FIG. 7, the game server 302 requests that the game spectator 108 control an aspect of the network game of the game player 108. The request is transmitted directly or indirectly from the game server 302 to the web server 110. The web server 110 displays the request together with a broadcast of the network game, which may be a specific client view of the game player 104. The web server 110 receives the spectator input information 720 from the game spectator 108, and transmits the spectator input information 722 to the game server 302. The game server 302 controls the aspect of the network game of the game player 104 in accordance with the spectator input information 722, possibly depending on whether the game player 104 accepts an option for accepting the spectator input information 722. According to such embodiments, the game server 302 does not transmit any game information to the game spectator 108. The game server 302 also does not receive any input from the game spectator 108, but rather, receives the spectator input information 722 from the web server 110.

While FIG. 7 shows the broadcast of the network game, including the request for the spectator input information, as being provided via the web server 110, it should be understand that the broadcast and the request may be provided directly to the game spectator 108 from the game system 102 in additional embodiments of the present disclosure. For example, the broadcast and the request may be transmitted to the game spectator 108 from the broadcaster 306. In this regard, the game spectator 108 may provide the spectator input information 720 directly to the game server 302, or to the game system 102. It should even further be understood that the rendering server 304 may provide the spectator game screen to the game spectator 108 in lieu of the broadcast of the network game. In such embodiments, the rendering server 304 or the game server 302 may provide the request for the spectator input information to the game spectator 108, whereupon the game spectator 108 provides the spectator input information 720 directly to the game server 302, or to the game system 102. In such embodiments, the game spectator 108 may be required to execute the game client for communicating with the game system 102.

According to further embodiments of the present disclosure, as shown by FIGS. 11-14, various methods for controlling a network game in accordance with an input of a game spectator are provided. The methods may be computer-implemented or implemented in accordance with any other known hardware or software which is capable of executing a set of instructions, steps, or features, sequentially or otherwise.

Figure 11:
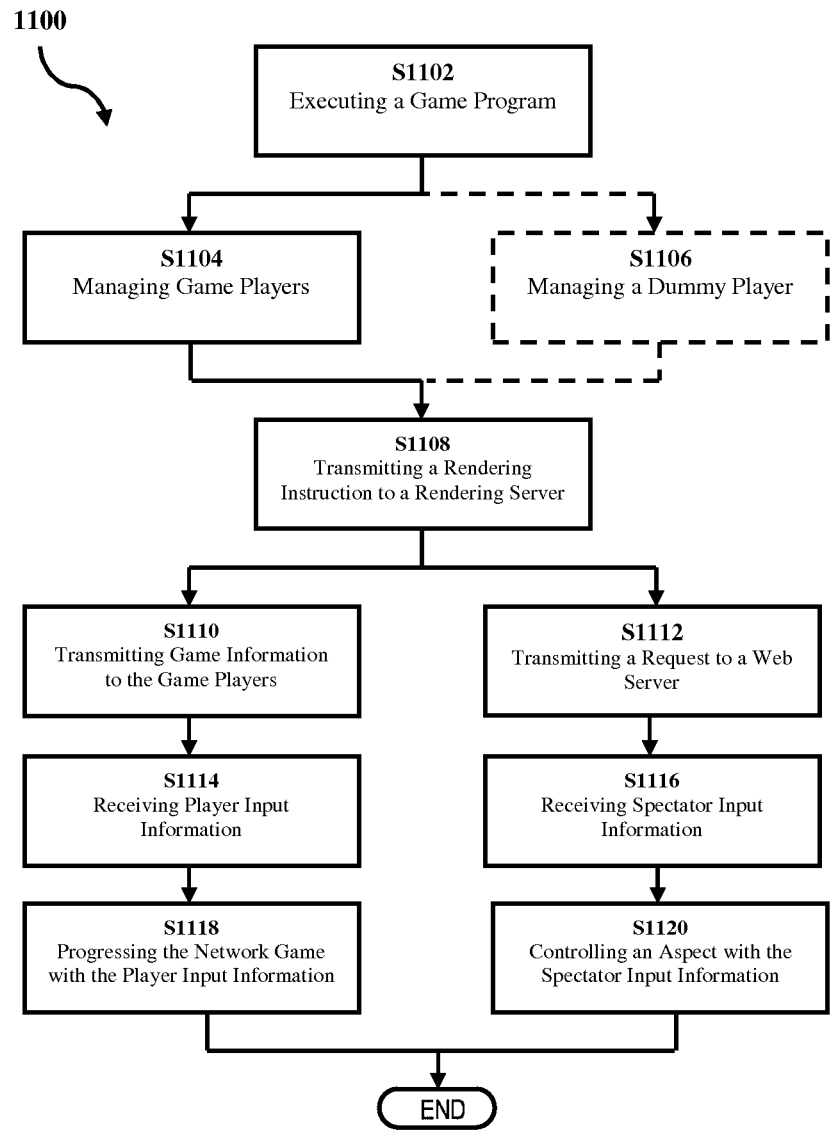
FIG. 11 shows an exemplary method of a game server of a network game system for controlling a network game in accordance with an input of a game spectator, according to an aspect of the present disclosure.

FIG. 11 shows an exemplary method of the game server 302 of FIG. 7. The method is generally shown at 1100. The game server 302 executes a game program at step S1102. The game server 302 may execute the game program, for example, when the network game begins, when the game server 302 is activated, or when the player input information 702 is received from the game player 104. The game server 302 manages game player information at step S1404. The game server 302 may create or update the game player information in accordance with the game process 600 of FIG. 6, or in accordance with any of the other embodiments described herein. The game server 302 may also manage dummy player information at step S1106. The game server 302 may create the dummy player information in accordance with the game process 800 of FIG. 8, and update the dummy player information in accordance with the game process 600 of FIG. 6. The game server 302 generates and transmits the rendering instruction 704, including game information on a progress of the network game, to the rendering server 304 at step S1108. The game information may include the managed game player information, the managed dummy player information, and/or any additional information. The game server 302 transmits network game information to the game players at step S1110, and transmits the spectator input information request 716 to the web server 110 at step S1112. The network game information which is transmitted to the game player 104 at step S1110 may include, for example, the audio information 708 as described with respect to FIG. 7. Moreover, the network game information may also be transmitted to the game broadcaster 306 during step S1110. Thereafter, player input information is received from the game player 104 at step S1114, and spectator input information is received from the web server 110 at step S1116. The player input information may include, for example, the player input information 702 as described with respect to FIG. 7. The spectator input information may include, for example, the spectator input information 722 as described with respect to FIG. 7. The game server 302 progresses the network game in accordance with the player input information at step S1118, and also controls an aspect of the network game of the game player 104 in accordance with the spectator input information at step S1120. The processing may thereafter be ended or resumed at step S1102 in accordance with, for example, each frame of the network game. Of course, the method of FIG. 11 is merely exemplary and may additionally or alternatively include any of the features described with respect to the game server 302 herein.

Figure 12:
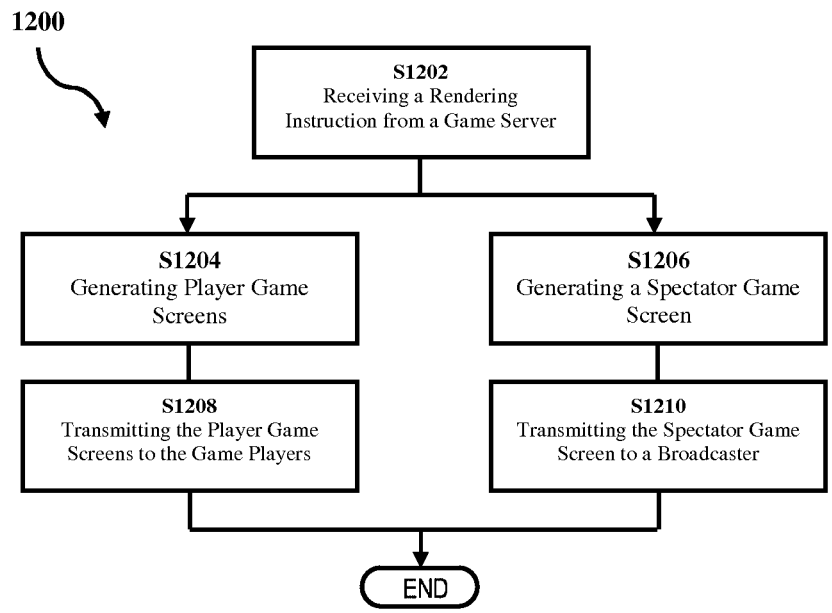
FIG. 12 shows an exemplary method of a rendering server of a network game system for controlling a network game in accordance with an input of a game spectator, according to an aspect of the present disclosure.

FIG. 12 shows an exemplary method of the rendering server 304 of FIG. 7. The method is generally shown at 1200. The rendering server 304 receives the rendering instruction 704, including the game information, at step S1202. The request for the spectator input information may further be received at step S1202 in additional embodiments of the present disclosure. The rendering server 304 generates a player game screen at step S1204, and generates a spectator game screen at step S1206. The rendering server 304 may generate the player game screen and the spectator game screen in accordance with any of the embodiments described herein. The rendering server 304 transmits the player game screen to the game player 104 at step S1208, and transmits the spectator game screen to the broadcaster 306 at step S1210. The request for the spectator input information may also be transmitted to the broadcaster at step S1210. Thereafter, processing may end or be restarted. The processing may, for example, be executed each frame of the network game. Of course, the method of FIG. 12 is merely exemplary and may additionally or alternatively include any of the features described with respect to the rendering server 304 herein.

Figure 13:
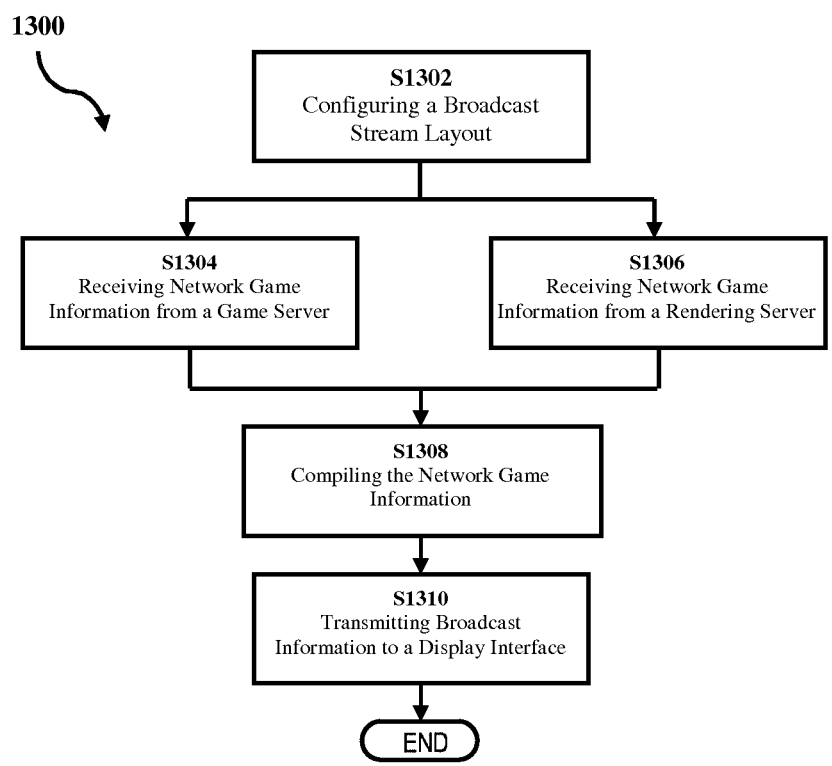
FIG. 13 shows an exemplary method of a broadcaster of a network game system for controlling a network game in accordance with an input of a game spectator, according to an aspect of the present disclosure.

FIG. 13 shows an exemplary method of the broadcaster 306 of FIG. 7. The method is generally shown at 1300. The broadcaster 306 may initially be configured to define a broadcast stream layout including any combination of audio, data, and video sources at step S1302. The broadcaster 306 receives network game information from the game server 302 at step S1304, and receives network game information from the rendering server 304 at step S1304. The network game information which is received from the game server 302 at step S1304 may include, for example, the game server broadcast information 714 as described with respect to FIG. 7 and also the request for the spectator input information. The network game information which is received from the rendering server 304 at step S1306 may include, for example, the rendering server broadcast information 710 as described with respect to FIG. 7. The broadcaster 306 compiles the network game information received from the game server 302 and the rendering server 304 at step S1308, and transmits a broadcast of the network game, such as the broadcast information 712 as described with respect to FIG. 7, to the web server 110 at step S1310. Thereafter, processing may end or be restarted. The processing may, for example, be executed each frame of the network game. Of course, the method of FIG. 13 is merely exemplary and may additionally or alternatively include any of the features described with respect to the broadcaster 306 herein.

Figure 14:
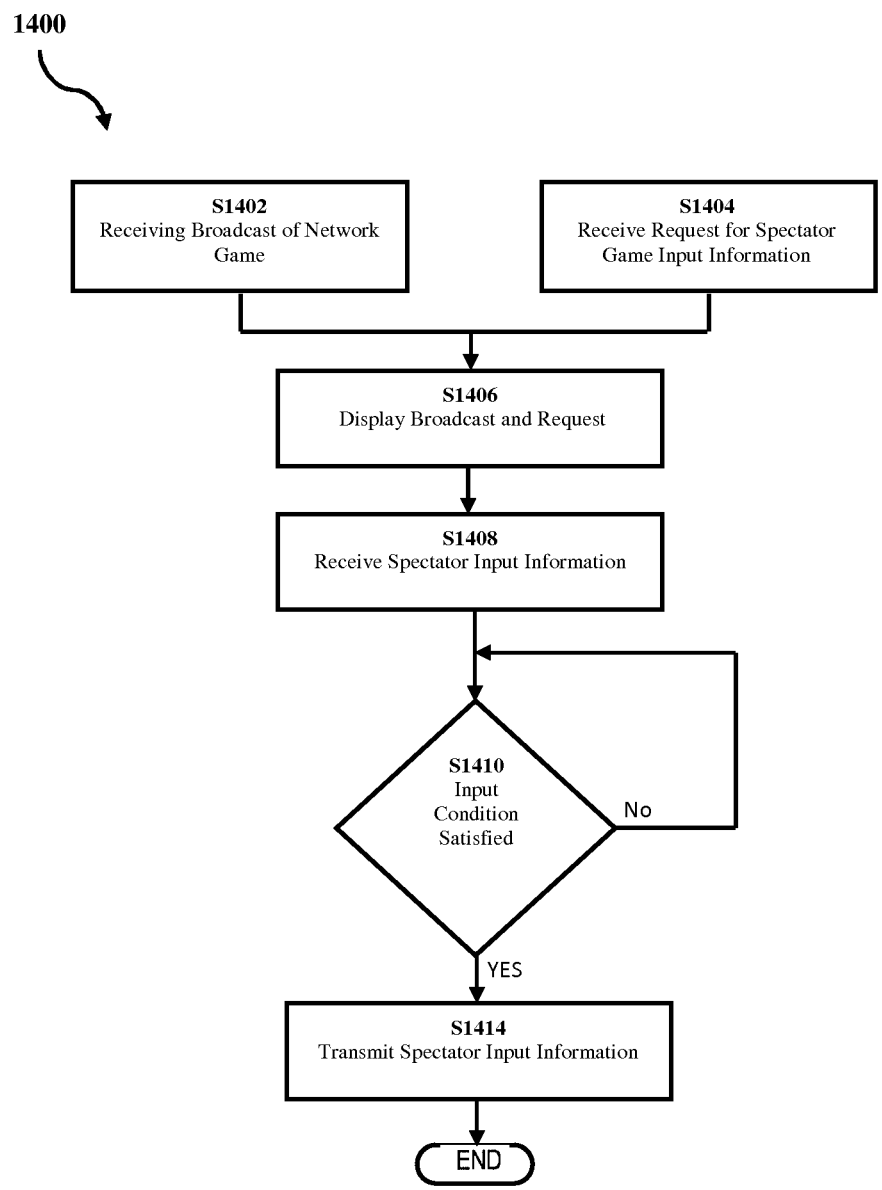
FIG. 14 shows an exemplary method of a display interface of a network game system for controlling a network game in accordance with an input of a game spectator, according to an aspect of the present disclosure.

FIG. 14 shows an exemplary method of the web server 110 of FIG. 7. The method is generally shown at 1400. The web server 110 receives the broadcast of the network game, including the spectator game screen, from the broadcaster 306 at step S1402 and receives the request for spectator input information directly or indirectly from the server 302 at step S1404. The web server 110 displays the broadcast and the request at step S1406, and receives spectator input information from the game spectator 108 in response to the request at step S1408. Thereafter, the web server 110 may determine whether an input condition for the spectator input information is satisfied at step S1410. Upon determining that the input condition is satisfied, the web server 110 transmits the spectator input information to the game server 302 at step S1414. Thereafter, processing may end or be restarted. The processing may, for example, be executed each frame of the network game. Of course, the method of FIG. 14 is merely exemplary and may additionally or alternatively include any of the features described with respect to the web server 110 herein.

Although systems, methods, and media for broadcasting a network game to a game spectator have been described with reference to several exemplary embodiments, it is understood that the words that have been used are words of description and illustration, rather than words of limitation. Changes may be made within the purview of the appended claims, as presently stated and as amended, without departing from the scope and spirit of the systems, methods, and media for broadcasting a network game to a game spectator in their aspects.

Although systems, methods, and media for broadcasting a network game to a game spectator have been described with reference to particular means, materials and embodiments, the systems, methods, and media are not intended to be limited to the particulars disclosed; rather the systems, methods, and media for broadcasting a network game to a game spectator extend to all functionally equivalent structures, methods, and uses such as are within the scope of the appended claims.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present specification describes components and functions that may be implemented in particular embodiments with reference to particular standards and protocols, the disclosure is not limited to such standards and protocols. Such standards are periodically superseded by more efficient equivalents having essentially the same functions. Accordingly, replacement standards and protocols having the same or similar functions are considered equivalents thereof.

The illustrations of the embodiments described herein are intended to provide a general understanding of the structure of the various embodiments. The illustrations are not intended to serve as a complete description of all of the elements and features of the disclosure described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

Methods described herein are illustrative examples, and as such are not intended to require or imply that any particular process of any embodiment be performed in the order presented. Words such as "thereafter," "then," "next," etc. are not intended to limit the order of the processes, and these words are instead used to guide the reader through the description of the methods. Further, any reference to claim elements in the singular, for example, using the articles "a," "an," "the," etc. is not to be construed as limiting the element to the singular.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The preceding description of the disclosed embodiments is provided to enable any person skilled in the art to make or use the present disclosure. As such, the above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A game system for controlling a network game in accordance with an input of a game spectator, the game system comprising:
    a network interface that receives player input information from a game player, spectator input information from the game spectator, and personal information of the game spectator in association with the spectator input information;
    a processor; and
    a memory that includes a game program including a set of instructions that, when executed by the processor, causes the processor to perform operations including:
        progressing the network game in accordance with the player input information received by the network interface from the game player;
        transmitting an option for accepting the spectator input information to the game player based on the spectator input information received by the network interface;
        controlling an aspect of the network game of the game player in accordance with the spectator input information received by the network interface in response to verifying the personal information of the game spectator and the game player accepting the option; and
        penalizing the game player for accepting the option,
    wherein the spectator input information specifies the game player and the aspect of the network game of the game player to be controlled.

2. The game system according to claim 1, wherein the game player executes a game client that establishes a connection with the game system for transmitting the player input information to the network interface, and the game spectator does not execute the game client.

3. The game system according to claim 2, wherein the network interface receives the spectator input information from the game spectator via a web server, the web server providing a broadcast of the network game to the game spectator.

4. The game system according to claim 3, further comprising:
    a broadcaster that transmits the broadcast of the network game to the web server.

5. The game system according to claim 4, further comprising:
    a game server that includes the network interface, the processor, and the memory; and
    a rendering server that receives game information from the game server, generates a player game screen for the game player, and generates a spectator game screen for the game spectator,
    wherein the player game screen is transmitted to the game player for display by the game player, and
    the spectator game screen is transmitted to the broadcaster for transmission to the web server as the broadcast of the network game.

6. The game system according to claim 5, wherein the spectator game screen comprises the player game screen.

7. The game system according to claim 5, wherein the game server, the rendering server, and the broadcaster do not transmit any game data to the game spectator.

8. The game system according to claim 4, wherein
    the broadcaster transmits identification information to the web server in association with the broadcast of the network game for identifying the game player,
    the network interface receives the identification information from the web server in association with the spectator input information, and
    the processor determines the game player from among a plurality of game players based on the identification information.

9. The game system according to claim 4, wherein the web server provides the broadcast of the network game to the game spectator as a unicast transmission.

10. The game system according to claim 1, wherein
    the spectator input information specifies a player character of the game player, and
    the processor controls an aspect of the player character in the network game.

11. The game system according to claim 10, wherein the aspect of the player character includes at least one of a hit point of the player character and an item inventory.

12. The game system according to claim 1, wherein the network interface is configured to receive the spectator input information at an arbitrary timing during a progress of the network game.

13. The game system according to claim 1, wherein the operations further comprise:
    transmitting a request for the spectator input information, wherein the spectator input information is received by the network interface in response to the request.

14. The game system according to claim 1, wherein the processor controls the aspect of the network game when the network interface receives the spectator input information, depending on whether the game player accepts the option.

15. A method for controlling a network game hosted by a game system in accordance with an input of game spectator, the method comprising:
    receiving, by a network interface, player input information from a game player;
    receiving, by the network interface, spectator input information from the game spectator and personal information of the game spectator in association with the spectator input information;
    controlling, by a processor, a progress of the network game in accordance with the player input information received by the network interface from the game player;
    transmitting an option for accepting the spectator input information to the game player based on the spectator input information received by the network interface;
    controlling, by the processor, an aspect of the network game of the game player in accordance with the spectator input information received by the network interface in response to verifying the personal information of the game spectator and the game player accepting the option; and
    penalizing the game player for accepting the option,
    wherein the spectator input information specifies the game player and the aspect of the network game to be controlled.

16. The method according to claim 15, wherein
    the game player executes a game client that establishes a connection with the game system for transmitting the player input information to the network interface, and
    the game spectator does not execute the game client.

17. A non-transitory computer-readable medium including a program for controlling a network game hosted by a game system in accordance with an input of a game spectator, the program, when executed by at least one processor of the game system, causing the game system to perform operations comprising:
    receiving, by a network interface, player input information from a game player;
    receiving, by the network interface, spectator input information from the game spectator and personal information of the game spectator in association with the spectator input information;
    controlling, by a processor, a progress of the network game in accordance with the player input information received by the network interface from the game player;
    transmitting an option for accepting the spectator input information to the game player based on the spectator input information received by the network interface;
    controlling, by the processor, an aspect of the network game of the game player in accordance with the spectator input information received by the network interface in response to verifying the personal information of the game spectator and the game player accepting the option; and
    penalizing the game player for accepting the option,
    wherein the spectator input information specifies the game player and the aspect of the network game to be controlled.

18. The non-transitory computer-readable medium according to claim 17, the operations further comprising:
    the game player executes a game client that establishes a connection with the game system for transmitting the player input information to the network interface, and
    the game spectator does not execute the game client.

* * * * *